United States Patent
Liu et al.

(10) Patent No.: US 12,296,408 B2
(45) Date of Patent: May 13, 2025

(54) SYSTEMS FOR AND METHODS OF FORMING MICRO-HOLES IN GLASS-BASED OBJECTS USING AN ANNULAR VORTEX LASER BEAM

(71) Applicant: CORNING INCORPORATED, Corning, NY (US)

(72) Inventors: Anping Liu, Horseheads, NY (US); Matthew Ryan Ross, Big Flats, NY (US); Craig John Mancusi Ungaro, Corning, NY (US); Erin Kathleen Watkins, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 563 days.

(21) Appl. No.: 17/440,364

(22) PCT Filed: Mar. 2, 2020

(86) PCT No.: PCT/US2020/020629
§ 371 (c)(1),
(2) Date: Sep. 17, 2021

(87) PCT Pub. No.: WO2020/190489
PCT Pub. Date: Sep. 24, 2020

(65) Prior Publication Data
US 2022/0347796 A1  Nov. 3, 2022

Related U.S. Application Data

(60) Provisional application No. 62/821,667, filed on Mar. 21, 2019.

(51) Int. Cl.
*B23K 26/402* (2014.01)
*B23K 26/064* (2014.01)
(Continued)

(52) U.S. Cl.
CPC .......... *B23K 26/402* (2013.01); *B23K 26/064* (2015.10); *B23K 26/0734* (2013.01);
(Continued)

(58) Field of Classification Search
CPC .... B23K 26/064; B23K 26/384; G02B 5/001; G02B 5/1871; G02B 5/1861;
(Continued)

(56) References Cited

U.S. PATENT DOCUMENTS

| | | |
|---|---|---|
| 4,623,776 A | 11/1986 | Buchroeder et al. |
| 5,583,342 A | 12/1996 | Ichie |

(Continued)

FOREIGN PATENT DOCUMENTS

| | | |
|---|---|---|
| CN | 102123818 A | 7/2011 |
| CN | 102138097 A | 7/2011 |

(Continued)

OTHER PUBLICATIONS

An Ran, et al., "Laser Micro-Hole Drilling of Soda-Lime Glass with Femtosecond Pulses", Chinese Physics Letters, vol. 21, 2004.
(Continued)

*Primary Examiner* — Erin Snelting
(74) *Attorney, Agent, or Firm* — Svetlana Z. Short

(57) ABSTRACT

The systems and methods disclosed herein utilize a beam-forming system configured to convert a Gaussian laser beam into an annular vortex laser beam having a relatively large depth of focus, which enables the processing of thick or stacked glass-based objects annular laser beam is defined in part by a topological charge m that defines an amount of rotation of the annular vortex beam around its central axis as it propagates annular vortex beam is used to form micro-holes in a glass-based object using either a one-step or a two-step method micro-holes formed by either process can be in the form of recesses or through-holes, depending on
(Continued)

the application size of the micro-holes can be controlled by controlling the size of the annular vortex beam over the depth of focus range.

23 Claims, 25 Drawing Sheets

(51) Int. Cl.

| | | |
|---|---|---|
| B23K 26/073 | (2006.01) | |
| B23K 26/382 | (2014.01) | |
| B23K 26/386 | (2014.01) | |
| B23K 26/53 | (2014.01) | |
| C03C 15/00 | (2006.01) | |
| C03C 23/00 | (2006.01) | |
| G02B 5/00 | (2006.01) | |
| G02B 27/09 | (2006.01) | |
| B23K 103/00 | (2006.01) | |

(52) U.S. Cl.
CPC .......... *B23K 26/382* (2015.10); *B23K 26/386* (2013.01); *B23K 26/53* (2015.10); *C03C 15/00* (2013.01); *C03C 23/0025* (2013.01); *G02B 5/001* (2013.01); *G02B 27/0916* (2013.01); *G02B 27/0927* (2013.01); *G02B 27/0938* (2013.01); *B23K 2103/54* (2018.08)

(58) Field of Classification Search
CPC .. G02B 5/1866; G02B 26/06; G02B 27/0068; G02B 27/0087; C03C 23/0025
See application file for complete search history.

(56) References Cited

U.S. PATENT DOCUMENTS

| | | |
|---|---|---|
| 6,333,485 B1 | 12/2001 | Haight et al. |
| 6,990,285 B2 | 1/2006 | Schroeder et al. |
| 7,261,824 B2 | 8/2007 | Schlautmann et al. |
| 8,035,901 B2 | 10/2011 | Abramov et al. |
| 8,101,929 B1 | 1/2012 | Christodoulides et al. |
| 8,526,091 B2 | 9/2013 | Ito et al. |
| 8,736,026 B2 | 5/2014 | Schmidt et al. |
| 9,108,271 B2 | 8/2015 | Sepp et al. |
| 9,278,886 B2 | 3/2016 | Boek et al. |
| 9,296,066 B2 | 3/2016 | Hosseini et al. |
| 9,321,680 B2 | 4/2016 | Chuang et al. |
| 9,346,706 B2 | 5/2016 | Bazemore et al. |
| 9,517,963 B2 | 12/2016 | Marjanovic et al. |
| 9,757,815 B2 | 9/2017 | Hosseini |
| 9,815,730 B2 | 11/2017 | Marjanovic et al. |
| 9,850,160 B2 | 12/2017 | Marjanovic et al. |
| 9,878,400 B1 | 1/2018 | Olesen et al. |
| 10,010,971 B1 | 7/2018 | Hosseini |
| 10,047,001 B2 | 8/2018 | West |
| 10,131,016 B1 | 11/2018 | Bareman et al. |
| 10,494,290 B2 | 12/2019 | Chen et al. |
| 10,620,444 B2 | 4/2020 | Kumkar et al. |
| 10,730,783 B2 | 8/2020 | Akarapu et al. |
| 11,344,972 B2 | 5/2022 | Genier |
| 2002/0125230 A1 | 9/2002 | Haight et al. |
| 2005/0173388 A1 | 8/2005 | Lavers et al. |
| 2006/0181978 A1 | 8/2006 | Koreeda et al. |
| 2008/0061042 A1 | 3/2008 | Nomaru |
| 2010/0027570 A1 | 2/2010 | Lizotte et al. |
| 2010/0315636 A1 | 12/2010 | Spriggs et al. |
| 2011/0000898 A1 | 1/2011 | Rumsby |
| 2013/0050838 A1 | 2/2013 | Nagano et al. |
| 2013/0208332 A1 | 8/2013 | Yu et al. |
| 2014/0027951 A1 | 1/2014 | Srinivas et al. |
| 2014/0199519 A1 | 7/2014 | Schillinger et al. |
| 2015/0038313 A1 | 2/2015 | Hosseini |
| 2015/0044416 A1 | 2/2015 | Hosseini |
| 2015/0136743 A1 | 5/2015 | Hosseini |
| 2015/0165562 A1 | 6/2015 | Marjanovic et al. |
| 2015/0166393 A1 | 6/2015 | Marjanovic et al. |
| 2015/0166396 A1 | 6/2015 | Marjanovic et al. |
| 2015/0205137 A1 | 7/2015 | Soskind et al. |
| 2015/0360991 A1 | 12/2015 | Grundmueller et al. |
| 2016/0016257 A1 | 1/2016 | Hosseini |
| 2016/0048032 A1 | 2/2016 | Soskind et al. |
| 2016/0054522 A1 | 2/2016 | Osellame et al. |
| 2016/0152508 A1 | 6/2016 | Kumkar |
| 2016/0159679 A1 | 6/2016 | West |
| 2016/0271727 A1 | 9/2016 | Courvoisier et al. |
| 2017/0023841 A1 | 1/2017 | N'Gom et al. |
| 2017/0103249 A1 | 4/2017 | Jin et al. |
| 2017/0189991 A1 | 7/2017 | Gollier et al. |
| 2017/0203994 A1 | 7/2017 | Chen et al. |
| 2017/0259375 A1 | 9/2017 | Kumkar et al. |
| 2017/0276951 A1 | 9/2017 | Kumkar et al. |
| 2017/0310071 A1 | 10/2017 | Xie et al. |
| 2018/0016179 A1 | 1/2018 | Canfield et al. |
| 2018/0029933 A1 | 2/2018 | Na Zou et al. |
| 2018/0062342 A1 | 3/2018 | Comstock et al. |
| 2018/0093914 A1 | 4/2018 | Akarapu et al. |
| 2018/0093941 A1 | 4/2018 | Anantaneni et al. |
| 2018/0134604 A1 | 5/2018 | Seidl et al. |
| 2018/0161916 A1 | 6/2018 | Hosseini |
| 2018/0169791 A1 | 6/2018 | Miller |
| 2018/0221988 A1 | 8/2018 | Liu et al. |
| 2019/0067049 A1 | 2/2019 | Cheng et al. |
| 2019/0129093 A1 | 5/2019 | Li et al. |
| 2019/0300417 A1 | 10/2019 | Stute |
| 2019/0321921 A1 | 10/2019 | Paris et al. |
| 2019/0366586 A1 | 12/2019 | Rieske et al. |
| 2020/0324368 A1 | 10/2020 | Hosseini |
| 2020/0361037 A1 | 11/2020 | Ivanov et al. |
| 2021/0146482 A1 | 5/2021 | Nomura et al. |
| 2021/0170530 A1 | 6/2021 | Kumkar et al. |
| 2022/0073427 A1 | 3/2022 | Ortner et al. |
| 2022/0252837 A1 | 8/2022 | McWhirter et al. |

FOREIGN PATENT DOCUMENTS

| | | |
|---|---|---|
| CN | 103018918 A | 4/2013 |
| CN | 103071928 A | 5/2013 |
| CN | 103079747 A | 5/2013 |
| CN | 103941402 A | 7/2014 |
| CN | 103974678 A | 8/2014 |
| CN | 104216121 A | 12/2014 |
| CN | 104339081 A | 2/2015 |
| CN | 104765153 A | 7/2015 |
| CN | 104923919 A | 9/2015 |
| CN | 105081565 A | 11/2015 |
| CN | 105242408 A | 1/2016 |
| CN | 105445943 A | 3/2016 |
| CN | 106029285 A | 10/2016 |
| CN | 107247329 A | 10/2017 |
| CN | 108803048 A | 11/2018 |
| CN | 109031674 A | 12/2018 |
| CN | 109420855 A | 3/2019 |
| DE | 102016123974 A1 | 6/2018 |
| EP | 2969375 A1 | 1/2016 |
| EP | 3292941 A1 | 3/2018 |
| EP | 3311947 A1 | 4/2018 |
| JP | 2005-021964 A | 1/2005 |
| JP | 2012-115875 A | 6/2012 |
| JP | 5531261 B2 | 6/2014 |
| KR | 10-2012-0133593 A | 12/2012 |
| KR | 10-2016-0010396 A | 1/2016 |
| KR | 10-2017-0028943 A | 3/2017 |
| KR | 10-1774290 B1 | 9/2017 |
| KR | 10-2018-0100063 A | 9/2018 |
| KR | 10-2019-0043586 A | 4/2019 |
| NL | 2017998 B1 | 6/2018 |
| TW | 201942078 A | 11/2019 |
| WO | 2014/144322 A1 | 12/2014 |
| WO | 2016/010991 A1 | 1/2016 |
| WO | 2017/188639 A1 | 11/2017 |
| WO | 2018/104536 A1 | 6/2018 |

(56) References Cited

FOREIGN PATENT DOCUMENTS

| | | |
|---|---|---|
| WO | 2019/023213 A1 | 1/2019 |
| WO | 2019/195378 A1 | 10/2019 |
| WO | 2021/108079 A1 | 6/2021 |

OTHER PUBLICATIONS

Arrizon et al; "Optimum Annular Focusing by a Phase Plate"; Physics Optics, (2015); 4 Pages.
C. L. Arnold, et al., "Nonlinear Bessel vortex beams for applications", J. Phys. B 48, 094006, 2015.
C. Lopez-Mariscal, et al., "The generation of nondiffracting beams using inexpensive computer-generated holograms", Am. J. Phys. vol. 75, 2007, pp. 36-42.
Carl Paterson, et al., "Higher-order Bessel waves produced by axicon-type computer-generated holograms", Optics Communications, vol. 124, 1996, pp. 121-130.
Chattrapiban, et al, "Generation of Nondiffracting Bessel Beams by Use of a Spatial Light Modulator", Optics Letters, vol. 28, No. 22, 2003, pp. 2183-2185.
D.J. Hwang, et al., "Liquid-assisted femtosecond laser drilling of straight and three-dimensional microchannels in glass," Applied Physics A, vol. 79, 2004, pp. 605-612.
Davis, et al, "Diffraction-Free Beams Generated With Programmable Spatial Light Modulators", Applied Optics, vol. 32, No. 31, 1993, pp. 6368-6370.
Durnin, et al, "Diffraction-Free Beams", Physical Review Letters, vol. 58, No. 15, 1987, pp. 1499-1501.
Garces-Chavez, et al, "Simultaneous Micromanipulation in Multiple Planes Using a Self-Reconstructing Light Beam", Nature, vol. 419, 2002, pp. 145-147.
Hiroshi Ogur, et al., "Hole Drilling of Glass Substrates with a CO2 Laser," Jpn. J. Appl. Phys. vol. 42, 2003, pp. 2881-2886.
J. Arlt, et al., "Generation of high-order Bessel beams by use of an axicon," Optics Communications, vol. 177, 2000, pp. 297-301.
J. Zhang, et al., "High-speed machining of glass materials by laser-induced plasma-assisted ablation using a 532-nm laser," Applied Physics A, vol. 67, 198, pp. 499-501.
Li, Peng, et al., "Generation of perfect vectorial vortex beams," Optics Letters, vol. 41 Issue 10, 2016, pp. 2205-2208.
Lucas A. Hof, et al., "Micro-Hole Drilling on Glass Substrates—A Review," Micromachines, vol. 8 Issue 53, 2017.
McGloin et al."Bessel beams: diffraction in a new light" Contemporary Physics, vol. 46 No. 1 (2005) pp. 15-28.
Porras, M.A., et al., "Stabilization of vortex beams in Kerr media by nonlinear absorption," Physical Review A, vol. 94 Issue 5, 2016, pp. 053810.
Pravin Vaity, et al., "Perfect vortex beam: Fourier transformation of a Bessel beam," vol. 40, 2015, pp. 597-600.
S.H. Tao, et al., "Fractional optical vortex beam induced rotation of particles," Appl. Opt. 43 2004, pp. 122-126.
Walde et al, "Engineering an Achromatic Bessel Beam Using a Phase-Only Spatial Light Modulator and an Iterative Fourier Transformation Algorithm", Optics Communications 383, 2017, pp. 64-68.
Wernicke, et al, "Liquid Crystal Display as Spatial Light Modulator for Diffractive Optical Elements and the Reconstruction of Digital Holograms", Proceedings of SPIE, vol. 4596, 2001, pp. 182-190.

Xie, Chen, et al., "Light trajectory in Bessel-Gauss vortex beams," Journal of the Optical Society of America A, vol. 32, issue 7, 2015, pp. 1313-1316.
International Search Report and Written Opinion of the International Searching Authority; PCT/US2020/020629; dated Jul. 2, 2020; 9 pages; European Patent Office.
Chinese Patent Application No. 202080023063.2, Office Action dated Dec. 4, 2023, 5 pages (English Translation only), Chinese Patent Office.
Korean Patent Application No. 10-2021-7033269, Office Action dated Nov. 11, 2024, 5 pages (English Translation only), Korean Patent Office.
"New Developments in Laser Resonators" by A.E. Siegman in SPIE Symposium Series vol. 1224, p. 2 (1990).
A. E. Siegman, "New Developments in Laser Resonators", Invited Paper, SPIE vol. 1224 Optical Resonators, 1990, pp. 14.
Ahmed et al., "Display glass cutting by femtosecond laser induced single shot periodic void array", Applied Physics Letters, vol. 93, 2008, pp. 189-192.
Beck et al., "Application of cooled spatial light modulator for high power nanosecond laser micromachining," Opt. Express, vol. 18, 17059-17065 (2010).
Bhuyan et al., "High aspect ratio taper-free microchannel fabrication using femtosecond Bessel beams," Opt. Express, vol. 18, 566-574 (2010).
Birch et al., "Real-time optical aberration correction with a ferroelectric liquid-crystal spatial light modulator," Applied Optics vol. 37, No. 11, 1998 pp. 2164-2169.
Borghi et al., "M2 factor of Bessel-Gauss Beams", Optics Letters, vol. 22, No. 5, 1997, pp. 262-264.
Chremmos et al., "Bessel-like optical beams with arbitrary trajectories," Opt. Lett., vol. 37, 5003-5005 (2012).
F. Courvoisier et al., "[INVITED] Ultrafast laser micro- and nanoprocessing with nondiffracting and curved beams Invited paper for the section: Hot topics in Ultrafast Lasers", Optics And Laser Technology, Elsevier Science Publishers BV., Amsterdam, NL, vol. 80, Jan. 2016, 54 pages.
Hnatovsky et al., "Fabrication of microchannels in glass using focused femtosecond laser radiation and selective chemical etching", Applied Pyhsics A, 84 pp. 47-61.
Jenne et al; "High-Quality Tailored-Edge Cleaving Using Aberration-Corrected Bessel-Like Beams"; Optics Letters; vol. 43, No. 13 (2018) pp. 3164-3167.
Jesacher et al., "Parallel direct laser writing in three dimensions with spatially dependent aberration correction," Opt. Express, vol. 18, 21090-21099 (2010).
Mezentsev et al., "Femtosecond laser microfabrication of subwavelength structures in photonics", Proceesings of SPIE, vol. 6107, 20017, 11 pages.
Polynkin et al., "Curved Plasma Channel Generation Using Ultraintense Airy Beams", Science, vol. 324, 2009, pp. 229-232.
Stuart et al., "Nanosecond-to-femtosecond laser-induced breakdown in dielectrics", Physical Review B, vol. 53, 1996, 13 pages.
Sudrie et al., "Femtosecond Laser-Induced Damage and Filamentary Propagation in Fused Silica", Physical Review, vol. 89, 2002, 4 pages.
Vishnubhatla et al., "Shape control of microchannels fabricated in fused silica by femtosecond laser irradiation and chemical etching," Opt. Express, vol. 17, 8685-8695 (2009).

SYSTEMS FOR AND METHODS OF FORMING MICRO-HOLES IN GLASS-BASED OBJECTS USING AN ANNULAR VORTEX LASER BEAM

CROSS-REFERENCE TO RELATED APPLICATIONS

This application claims the benefit of priority under 35 U.S.C. § 371 of International Application No. PCT/US2020/020629, filed on Mar. 2, 2020, which claims the benefit of priority under 35 U.S.C. § 119 if U.S. Provisional Application No. 62/821,667, filed Mar. 21, 2019, the content of which is incorporated herein by reference in its entirety.

FIELD

The present disclosure relates to forming micro-holes, and in particular relates to systems for and methods of forming micro-holes in glass-based objects using an annular vortex laser beam.

BACKGROUND

Glass-based materials (e.g., glass, glass ceramics and crystals) are finding increasing use in commercial devices such as displays, televisions, laptop computers, GPS devices and smart phones. Glass-based materials have many physical properties relating to thermal expansion, electrical insulation, optical transmission, strength, chemical stability, and bonding ability (e.g., to silicon) that make them an excellent choice for combining with electrical and mechanical components of the particular commercial device. The glass-based materials can be used to define different types of device components, such as a cover screen or flat panel for a display, optical waveguides, optical interconnects, hybrid optical-electrical interconnects, etc.

The use of glass-based components in commercial devices often requires forming high-quality micro-holes in or through the component as part of the device manufacturing process. The micro-hole diameters can range from several microns to hundreds of microns while the micro-hole depth can range from tens of nanometers to several millimeters. The density of such micro-holes can range from a few to thousands per square centimeter. In the case where a relatively high density of micro-holes is required, the ability to form the micro-holes rapidly and with high accuracy and precision becomes important to ensure a satisfactory product throughput.

SUMMARY

Aspects of the disclosure are directed to a micro-hole-forming system that includes a beam-forming system. The beam-forming system is configured to convert a conventional Gaussian laser beam ("Gaussian beam") into a vortex laser beam having an annular cross-sectional shape ("profile") and that has a larger depth of focus than the corresponding conventional Gaussian diffracted beam (e.g., from least 1.1× larger up to at least 2× larger or up to 3× larger or up to 5× larger or up to 10× larger by way of non-limiting examples). The vortex laser beam with the annular cross-section ("annular vortex beam") is a non-diffracting light beam that has a topological charge m (integer) that defines an amount of rotation of the beam around its central axis as it propagates. The annular vortex beam is formed in a manner that gives it a relative large depth of focus as compared to a traditional Gaussian beam while also providing a larger diameter than the Bessel beam. The annular vortex beam is used to form micro-holes in a glass-based object using either a one-step or a two-step method. The micro-holes formed by either process can be closed ended (e.g., recesses) or open ended (through holes) depending on the given application.

In the one-step method, the annular vortex beam has sufficient energy (e.g., a peak intensity in the range from 110 TW/cm$^2$ to 480 TW/cm$^2$) to form a hollow cylindrical region in the body of the glass-based object via ablation of the glass-based material. The ablation process creates an annular gap or hole in the body of the glass-based object. In the case where the annular gap does not extend all the way through the body of the glass object (i.e., from a top surface to a bottom surface, or an outer surface to an inner surface, etc.), there is a central portion surrounded by the gap. In the case where the annular gap extends sufficiently far through the body of the glass-based object, the central portion is easily removed without any further substantial processing to form a through hole. In the case where the annular gap reaches the bottom surface, the central portion becomes disconnected from the rest of the body of the glass-based object and simply falls away or is readily removed.

Rather than forming an annular gap directly with the annular vortex beam in a single step, the two-step process relies on irradiating the glass-based object with the annular vortex beam to form a modified annular region within the body of the glass-based object. In an example, the glass material in the modified annular region is altered (e.g., damaged by densification) so that it etches preferentially relative to the untransformed (non-irradiated) portion of the body, such as the central portion or the portion of the body outside of the modified annular region. An etching process (e.g., acid etching) is then used to remove the modified region to form the micro-hole.

Compared to the one-step process, the two-step process generally uses a lower laser power and a shorter laser processing time, but uses an additional step. When the additional step comprises etching, it can have the added benefit of removing surface flaws and micro-cracks that may be induced by irradiation with the annular vortex beam. Both the one-step method and the two-step method can be used on a glass-based object (e.g., a panel) to form large numbers of micro-holes with a high throughput (e.g. 3000 micro-holes/second laser processing time for the two-step process followed by a 60 minute etch (etching done on all holes simultaneously), or 1 micro-hole/second laser processing time for the one-step process) without compromising the panel strength. The micro-holes can have diameters from tens of microns to hundreds of microns and through thicknesses up to several millimeters.

An embodiment of the disclosure is directed to a method of forming a micro-hole in a glass-based object having a body that defines opposite first and second surfaces. The method comprising: a) forming a phase device with a phase distribution defined by $\phi_{PD}(r,\theta)=\phi_1(r,\theta)+\phi_2(r,\theta)$, wherein $\phi_1(r,\theta)$ is a first phase term equal to $-k \cdot r \cdot \sin(\gamma)$ and $\phi_2(r,\theta)$ is a second phase term equal to $m \cdot \theta$, where $(r, \theta)$ are polar radial and angular coordinates, $\gamma$ is an axicon angle in the range $0.10° \leq \gamma \leq 20°$, and m is a topological charge in the range $3 \leq m \leq 20$, where m is an integer; b) directing a Gaussian laser beam to the phase device to convert the Gaussian beam to an annular vortex beam having the phase distribution $\phi_{PD}(r,\theta)$, a depth of focus DOF, a wavelength λ and a focus ring within the depth of focus DOF and having an inner diameter D1, an outer diameter D2, and a width WA=(D2−D1)/2; c) directing the annular vortex beam to the first surface and through the body of the glass-based object, thereby irradiating an annular region of the body within the depth of focus to form an irradiated annular region, wherein said irradiating either: i) transforms the irradiated annular region to a modified annular region that etches preferentially as compared to a portion of the body that has not been irradiated by the annular vortex beam; ii) transforms a portion of the irradiated annular region into a closed-end annular micro-hole by ablating the portion of the irradiated annular region; or iii) transforms the irradiated annular region into a through micro-hole by ablating the irradiated annular region.

Another embodiment of the disclosure is directed to a method of forming a micro-hole in a glass-based object having a body that defines opposite first and second surfaces. The methods comprises: a) forming an annular vortex beam having a depth of focus DOF, a wavelength λ and a focus ring within the depth of focus DOF, wherein the focus ring has an inner diameter D1, an outer diameter D2, and a width WA=(D2−D1)/2; b) directing the annular vortex beam to the first surface and through the body of the glass-based object, thereby irradiating an annular region of the body to transform the annular region to modified annular region that etches preferentially as compared to a portion of the body that has not been irradiated by the annular vortex beam; and c) etching the glass-based object to remove the modified annular region to form the micro-hole.

Another embodiment of the disclosure is directed to a method of forming a micro-hole in a glass-based object having a body that defines opposite first and second surfaces. The method comprises: a) forming an annular vortex beam having a depth of focus DOF, a wavelength λ and a focus ring within the depth of focus DOF, wherein the focus ring has an inner diameter D1, an outer diameter D2, and a width WA=(D2−D1)/2; and b) directing the annular vortex beam to the first surface and into the body of the glass-based object and either: i) ablating an annular portion of the body from the first surface but not reaching the second surface to form the micro-hole in the form of a closed annular micro-hole having a central portion; or ii) ablating an annular portion of the body from the first surface to the second surface to form the micro-hole as a substantially cylindrical through micro-hole.

Another embodiment of the disclosure is directed to a system for forming a micro-hole in a glass-based object having a body that defines opposite first and second surfaces. The system comprises: a) a laser source configured to generate a Gaussian laser beam; b) an optical system operably disposed to receive and process the Gaussian laser beam, the optical system including a phase device configured with a phase distribution $\phi_{PD}(r,\theta)=\phi_1(r,\theta)+\phi_2(r,\theta)$, wherein $\phi_1(r,\theta)$ is a first phase term equal to $-k\cdot r\cdot \sin(\gamma)$ and $\phi_2(r,\theta)$ is a second phase term equal to $m\cdot\theta$, where $(r, \theta)$ are polar radial and angular coordinates, γ is an axicon angle in the range $0.01°\leq\gamma\leq20°$, and m is a topological charge in the range $3\leq m\leq 20$, where m is an integer; c) wherein the Gaussian laser beam is processed by the optical system and the phase device therein to convert the Gaussian laser beam to an annular vortex beam that exits the optical system along a system axis, the annular vortex beam having the phase distribution $\phi_{PD}(r,\theta)$, a depth of focus DOF, a wavelength λ and a focus ring within the depth of focus DOF and having an inner diameter D1, an outer diameter D2, and a width WA=(D2−D1)/2; and d) a support stage configured to operably support the glass-based object relative to the annular vortex beam so that the annular vortex beam travels through the first surface and through the body of the glass-based object, thereby irradiating an annular region of the body within the depth of focus to form an irradiated annular region, wherein said irradiating either: i) transforms the irradiated annular region to a modified annular region that etches preferentially as compared to a portion of the body that has not been irradiated by the annular vortex beam; ii) transforms a portion of the irradiated annular region into a closed-end annular micro-hole by ablating the portion of the irradiated annular region; or iii) transforms the irradiated annular region into a through micro-hole by ablating the irradiated annular region.

Another embodiment of the disclosure is directed to a glass-based product formed by a process on a glass-based object having a body that defines opposite first and second surfaces. The process used to form the glass-based product comprises: a) forming a phase device with a phase distribution $\phi_{PD}(r,\theta)=\phi_1(r,\theta)+\phi_2(r,\theta)$, wherein $\phi_1(r,\theta)$ is a first phase term equal to $-k\cdot r\cdot\sin(\gamma)$ and $\phi_2(r,\theta)$ is a second phase term equal to $m\cdot\theta$, where $(r, \theta)$ are polar radial and angular coordinates, γ is an axicon angle in the range $0.10°\leq\gamma\leq20°$, and m is a topological charge in the range $3\leq m\leq 20$, where m is an integer; b) directing a Gaussian laser beam to the phase device to convert the Gaussian beam to an annular vortex beam having the phase distribution $\phi_{PD}(r,\theta)$, a depth of focus DOF, a wavelength λ and a focus ring within the depth of focus DOF and having an inner diameter D1, an outer diameter D2, and a width WA=(D2−D1)/2; c) directing the annular vortex beam to the first surface and through the body of the glass-based object, thereby irradiating a first annular region of the body within the depth of focus to form a first irradiated annular region, wherein said irradiating transforms the first irradiated annular region to a first modified annular region that etches preferentially as compared to a portion of the body that has not been irradiated by the annular vortex beam; and d) etching the first modified annular region to form an annular micro-hole in the body of the glass-based object.

Another embodiment of the disclosure is directed to the product-by-process described immediately above, wherein said irradiating includes forming a second irradiated annular region outside of and concentric with the first irradiated annular region so that said etching forms an annular recess surrounding the annular micro-hole.

Another embodiment of the disclosure is directed to a glass-based product formed by a process on a glass-based object having a body that defines opposite first and second surfaces. The process used to form the glass-based product comprises: a) forming a phase device with a phase distribution $\phi_{PD}(r,\theta)=\phi_1(r,\theta)+\phi_2(r,\theta)$, wherein $\phi_1(r,\theta)$ is a first phase term equal to $-k\cdot r\cdot\sin(\gamma)$ and $\phi_2(r,\theta)$ is a second phase term equal to $m\cdot\theta$, where $(r, \theta)$ are polar radial and angular coordinates, γ is an axicon angle in the range $0.10°\leq\gamma\leq20°$, and m is a topological charge in the range $3\leq m\leq 20$, where m is an integer; b) directing a Gaussian laser beam to the phase device to convert the Gaussian beam to an annular vortex beam having the phase distribution $\phi_{PD}(r,\theta)$, a depth of focus DOF, a wavelength λ and a focus ring within the depth of focus DOF and having an inner diameter D1, an outer diameter D2, and a width WA=(D2−D1)/2; and c) directing the annular vortex beam to the first surface and through the body of the glass-based object, thereby irradiating a first annular region of the body within the depth of focus to form a first irradiated annular region, wherein said irradiating transforms a portion of the irradiated annular region into a closed-end annular micro-hole by ablating the portion of the first irradiated annular region.

Another embodiment of the disclosure is directed to the product-by-process described immediately above, wherein said irradiating includes irradiating a second irradiated annular region outside of and concentric with the first irradiated annular region, wherein said irradiating of the second irradiated annular region ablates a portion of the first irradiated annular region to form an annular recess surrounding the annular micro-hole.

Another embodiment of the disclosure is directed to a glass-based product formed by a process on a glass-based object having a body that defines opposite first and second surfaces. The process used to form the glass-based product comprises: a) forming a phase device with a phase distribution $\phi_{PD}(r,\theta)=\phi_1(r,\theta)+\phi_2(r,\theta)$, wherein $\phi_1(r,\theta)$ is a first phase term equal to $-k \cdot r \cdot \sin(\gamma)$ and $\phi_2(r,\theta)$ is a second phase term equal to $m \cdot \theta$, where $(r, \theta)$ are polar radial and angular coordinates, $\gamma$ is an axicon angle in the range $0.10° \leq \gamma \leq 20°$, and m is a topological charge in the range $3 \leq m \leq 20$, where m is an integer; b) directing a Gaussian laser beam to the phase device to convert the Gaussian beam to an annular vortex beam having the phase distribution $\phi_{PD}(r,\theta)$, a depth of focus DOF, a wavelength $\lambda$ and a focus ring within the depth of focus DOF and having an inner diameter D1, an outer diameter D2, and a width WA=(D2−D1)/2; and c) directing the annular vortex beam to the first surface and through the body of the glass-based object, thereby irradiating a first and second concentric annular regions of the body within the depth of focus to form first and second irradiated annular regions, wherein said irradiating transforms the first irradiated annular region into a through micro-hole by ablating the first irradiated annular region and transforms the second irradiated annular region into an annular recess that surrounds the through micro-hole.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Coordinates (e.g., polar coordinates (r,θ) and Cartesian coordinates) are shown in some of the Figures for the sake of reference and are not intended to be limiting as to direction or orientation. The polar coordinates (r,θ) reside in the (x,y) plane as is conventional in the art.

The terms "downstream" and "upstream" are used to describe the relative locations of components or objects A and B relative to the direction of travel of light, wherein B being downstream of A means that the light moves in the direction from A to B and is incident upon A before being incident upon B.

The term "glass-based" is used herein to include any object made wholly or partly of glass, glass ceramic (including an amorphous phase and a crystalline phase) and crystalline materials.

The final glass-based objects as formed using the systems and methods described herein constitute a glass-based products or glass-based articles.

The phrase "P comprises Q" and like phrases use used herein is meant to include as a special case "P consists of Q."

The abbreviation "μm" means "micron" or micrometer, which is $10^{-6}$ meter.

The abbreviation "nm" means "nanometer," which is $10^{-9}$ meter.

The acronym "TW" stands for "terrawatts" or $10^{12}$ Watts.

Beam-Forming System

Figure 1A:
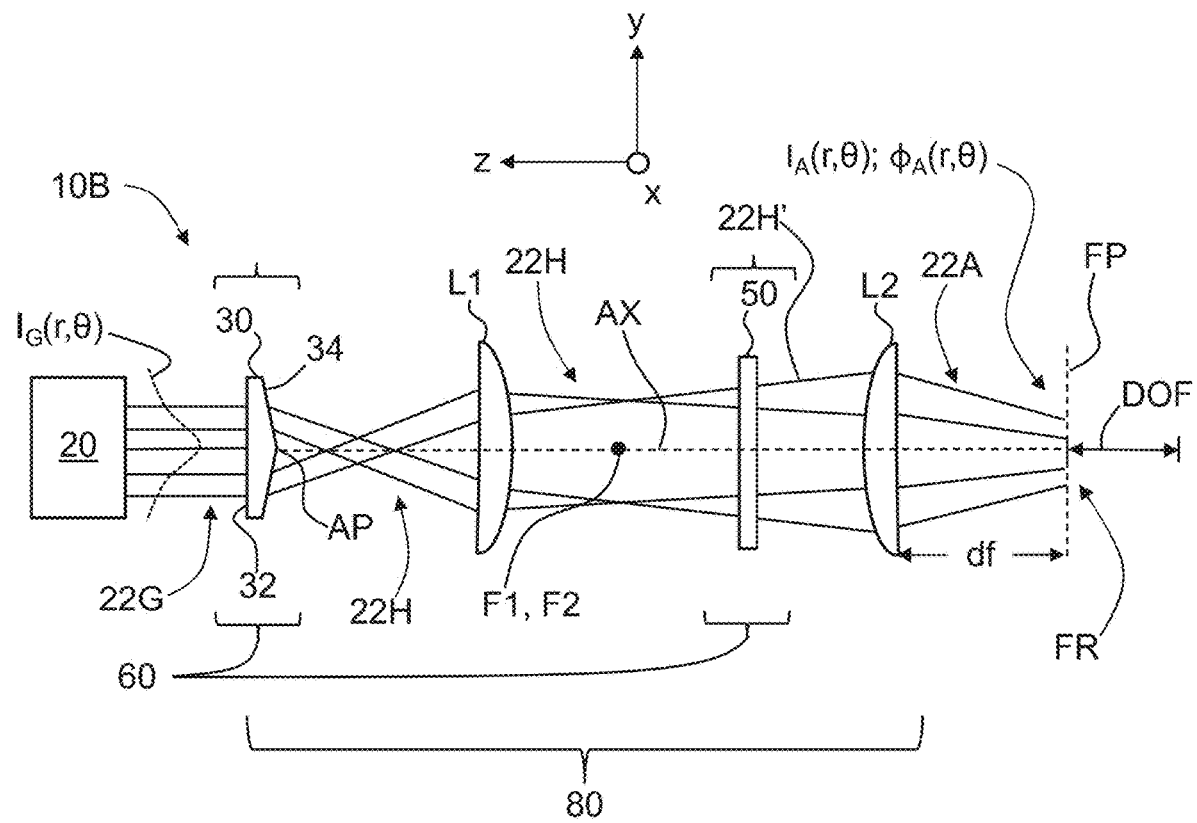
FIG. 1A is a schematic diagram of a beam-forming system as disclosed herein used to form an annular vortex beam used to form micro-holes in a glass-based object.

FIG. 1A is a schematic diagram of an example of beam-forming system 10B that forms the annular vortex beam suitable for forming micro-holes, as described below. The beam-forming system 10B includes a laser source 20 arranged along an optical axis AX. The laser source 20 emits along the optical axis AX a laser beam 22G having a Gaussian intensity distribution $I_G(r,\theta)$. The laser beam 22G (shown as 20G in FIG. 3A) is thus referred to hereinafter as "Gaussian beam" 22G. An example laser source operates at a wavelength λ of 1030 nm. An example laser source is a Yb-based diode-pumped laser that emits short (e.g., femtosecond to picosecond) light pulses LP (see close-up inset of FIG. 3C, introduced and discussed below). An example of such as laser source is the PHAROS laser, available from Light Conversion of Vilnius, Lithuania. In other examples, the laser source 20 can operate at a wavelength λ of 800 nm or 1064 nm, or other like wavelength at which pulsed lasers operate. In an example, the laser source 20 can generate light pulses LP having a pulse width in the range from 200 femtoseconds (fs) to 20 picoseconds (ps).

Figure 1B:
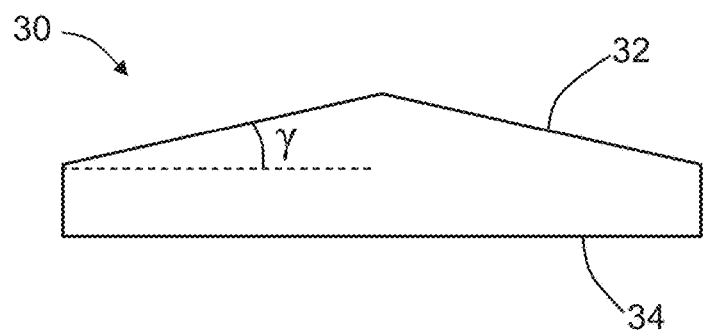
FIG. 1B is a close-up cross-sectional view of an example axicon lens showing the axicon angle $\gamma$.

The example beam-forming system 10B of FIG. 1A also includes an axicon lens 30 disposed along the optical axis AX and downstream of the laser source 20. The axicon lens 30 has opposite surfaces 32 and 34, with the surface 34 having a rotationally symmetric conic shape with the apex AP on the optical axis AX. FIG. 1B is a close-up view of an example axicon lens 30. The axicon lens 30 is defined by an angle γ, referred to herein as the axicon angle. The axicon lens 30 is shown as having a planar surface 34, but generally speaking this surface need not be planar. In an example, the axicon lens 30 is formed from fused silica and is shaped using precision lens-forming techniques known in the art so that the surfaces 32 and 34 are precision surfaces. In an example, the axicon angle γ can be in the range $0.10° \leq \gamma \leq 20°$.

The beam-forming system 10B also includes first and second spaced apart positive lenses L1 and L2 having respective focal lengths f1 and f2. In an example, f1=f2=f, and lens L2 is spaced apart a distance $2f$ from the focal point F1 of lens L1. A phase element 50 is disposed along the optical axis AX between the first and second lenses L1 and L2, e.g., at a distance f from lens L2 so that the second lens L2 constitutes a Fourier lens with respect to the phase element 50. Additionally, the lenses L1 and L2 may be placed at a distance f1+f2 from each other in a Fourier arrangement with respect to the axicon lens 30. The axicon lens 30, the lens elements L1 and L2 and the phase element 50 constitute an example optical system 80. The axicon lens 30 and the phase element 50 constitute an example of a phase device 60. Other configurations for the phase device 60 are discussed below.

The phase device 60 has an overall phase distribution $\phi_{PD}(r,\theta)$ while the phase element 50 has a phase distribution $\phi_{PE}(r,\theta)$. In an example, the phase element 50 comprises a phase plate. The phase element 50 can also comprise an active phase element (such as a spatial light modulator (SLM), or a deformable mirror), which in an example is reflective and folds the optical axis AX. In an example, the phase element 50 can comprise both a phase plate and an active phase element, or SLM, as illustrated in the example of FIG. 2B, introduced and discussed below. Suitable phase plates in the form of diffractive optical elements (DOEs) can be obtained from HOLO/OR Ltd., Ness Ziona, Israel.

Figure 1C:
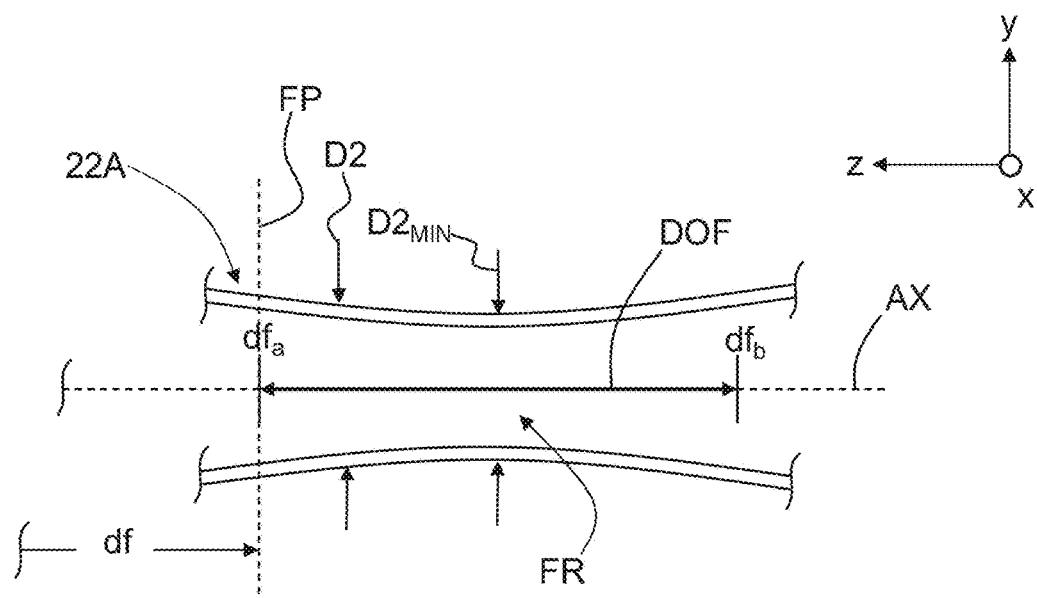
FIG. 1C is a close-up y-z cross-sectional view of the annular vortex beam in the region after the focus plane, illustrating the depth of focus (DOF) of the annular vortex beam.

The beam-forming system 10B has a focal plane FP located a distance df from lens L2. FIG. 1C is a close-up view of the focal plane FP and includes a schematic cross-sectional view of the annular vortex beam 22A. The vortex beam is formed starting around the focal plane FP located at the distance df. The peak intensity of the vortex beam 22A occurs at some axial distance after the distance df but within the depth of focus DOF of the vortex beam. The ideal or "best" plane for the annular vortex beam 22A for drilling micro-holes in the glass object 100 is a plane within the DOF such that the peak beam intensity falls within the object. This distance could range from a minimum value of $df_a$ to a maximum value of $df_b$. It is noted that the location of the focal plane FP for the system 10B is selected by way of example and convenience to correspond to the near end ($df_a$) of the depth of focus DOF, but it is emphasized that it can also be chosen to be at any location within the depth of focus, including at the mid-range or at the far end ($df_b$) of the depth of focus.

The annular vortex beam 22A is a substantially non-diffractive beam whose behavior at the focal plane FP differs from a conventional diffracted beam. The depiction of the annular vortex beam 22A in FIG. 1C and elsewhere is schematic and is intentionally oversimplified for ease of illustration and explanation of the apparatus and methods disclosed herein, including the concept of the depth of focus DOF for the annular vortex beam.

Figure 1D:
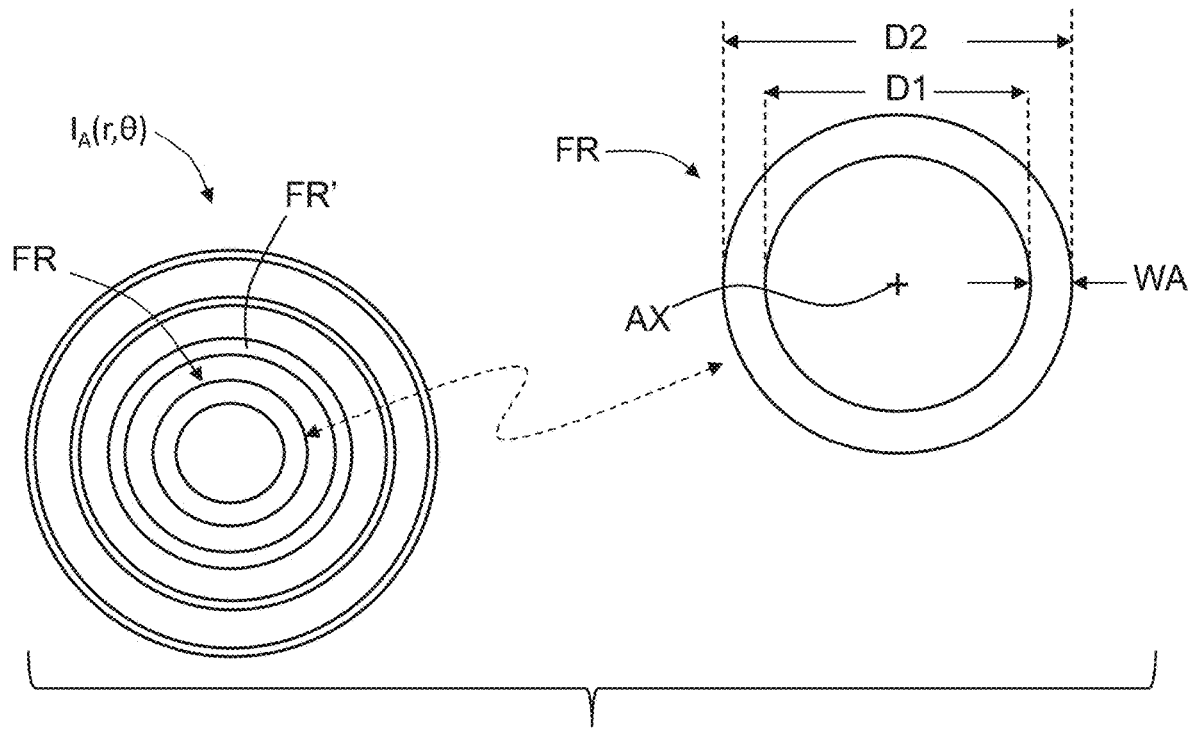
FIG. 1D is a close-up idealized representation of an example intensity distribution $I_A(r,\theta)$ of the annular vortex beam, with the close-up inset showing the focus ring (innermost intensity ring) and its various dimensions of interest, and also showing a secondary focus ring immediately adjacent the (main) focus ring.

With reference again to FIG. 1A, in the general operation of the beam-forming system 10B, the Gaussian beam 22G passes through the axicon lens 32, which converts the Gaussian laser beam into a hollow beam 22H. The hollow beam 22H travels to the first lens L1, which re-shapes the hollow beam 22H to have a select diameter. The re-shaped hollow beam 22H is then incident upon the phase element 50, which imparts a select phase to the hollow beam 22H to form a phase-altered hollow beam 22H'. The phase-altered hollow beam 22H' is then focused by the second lens L2 to form the annular vortex beam 22A, which has in intensity distribution $I_A(r, \theta)$ at the focus plane FP. An idealized example of the intensity distribution $I_A(r, \theta)$ is shown in FIG. 1D. The intensity distribution $I_A(r, \theta)$ includes a series of concentric rings, with the innermost intensity ring being the brightest and is referred to herein as the focus ring FR, as shown in FIG. 1D. A secondary focus ring FR' that is immediately adjacent the (main) focus ring FR is also shown. The secondary focus ring FR' typically has substantially less intensity than the (main) focus ring FR, though in some embodiments the secondary focus ring FR' can be made to have sufficient intensity to form features in the glass-based object 100, as described below.

The annular focus ring FR has an outer diameter D2 and an inner diameter D1, and an annular width WA. In an example, the outer diameter D2 can range from 5 μm to 60 μm while the annular width WA can range from 2 μm to 9 μm.

The annular focus ring FR can vary slightly in size within the depth of focus DOF. Generally, the depth of focus DOF of a non-diffracting beam such as a vortex beam is defined by the region through which the beam's maximum intensity stays above a certain intensity threshold value or intensity threshold percentage of the maximum intensity value. For example, the depth of focus DOF of the annular vortex beam 22A can be defined as an axial region where the maximum beam intensity does not fall below 25% of the maximum intensity of the annular vortex beam. Alternatively, the depth of focus can be defined as an axial region where the maximum intensity does not fall below a threshold intensity required for material ablation or material modification of the object 100, as discussed below.

Figure 2A:
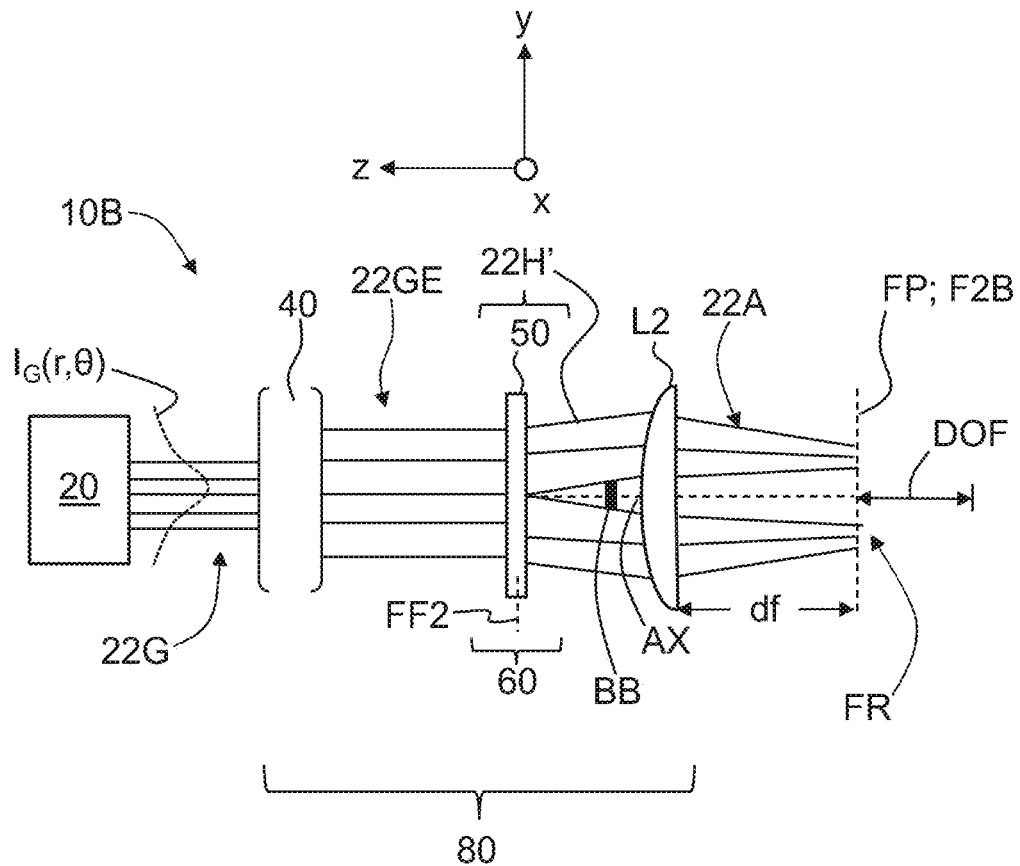
FIG. 2A is similar to FIG. 1A and illustrates an example embodiment wherein the phase device of FIG. 1 does not utilize an axicon lens so that the phase distribution is defined entirely by the phase element of the phase device.
Figure 2B:
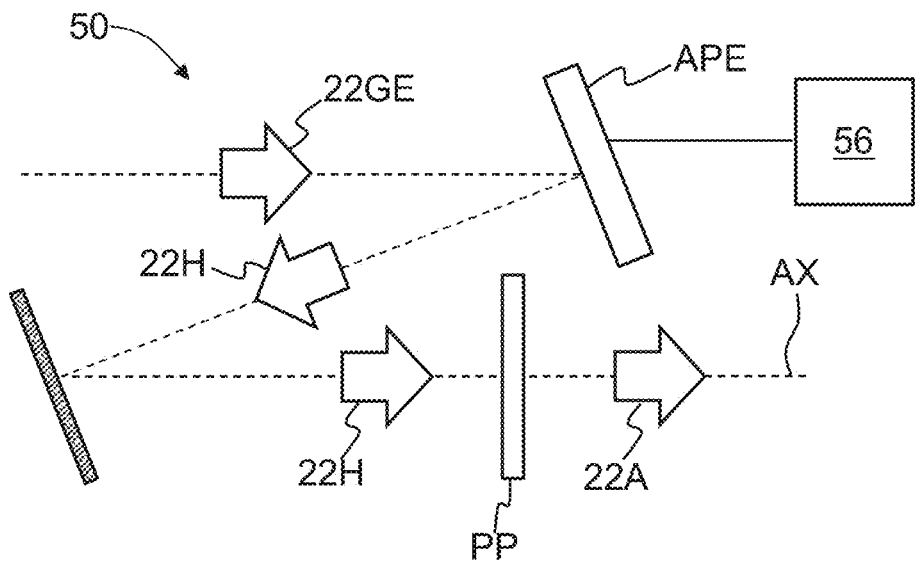
FIG. 2B is a schematic diagram of an example configuration of the phase element formed by an optically transmissive phase plate and an optically reflective active phase element.

FIG. 2A is similar to FIG. 1A and illustrates an example of the beam-forming system 10B, wherein the phase device 60 comprises just the phase element 50, i.e., there is no separate axicon lens 30 that resides upstream of the phase element. In an example, the axicon lens 30 can be replaced with a beam expander 40 that forms from the input Gaussian beam 22G an expanded Gaussian beam 22GE. The phase element 50 is located at a front focal plane FF2 of the lens L2 while the focal plane FP of the system 10B is located at a back focal plane F2B of the lens L2.

In the embodiment of FIG. 2A, the phase element 50 can comprise a phase plate, an active phase element or a combination of an active phase element and a phase plate, wherein the phase element is encoded with the axicon beam-forming properties (namely, the axicon angle γ) so that the beam exiting the phase element 50 is a phase-modulated hollow beam 22H', as explained below. Advantages of having the axicon lens 30 disposed upstream of the phase element 50 so that a hollow beam 22H is incident upon the phase element 50 are discussed below. In an example, a beam blocker BB can be arranged immediately downstream of the phase device 60 to assist in blocking any stray light that may reside in the center portion of the phase-encoded hollow beam 22H' due to a singularity of the center of the phase device 60 or imperfections in the phase modulation.

FIG. 2B is a close-up schematic diagram illustrating an example phase element 50 that comprises an active phase element APE and a phase plate PP. As noted above, the active phase element can comprise an SLM. A fold mirror FM is shown for convenience to fold the optical axis AX and keep the phase element 50 relatively compact for ease of illustration. The active phase element APE is operably connected to an APE controller 56 configured to control the operation of the active phase element (e.g., configure light-modulating elements therein, not shown) as is known in the art. The phase element 50 of FIG. 2B can include one or more additional optical components (e.g., lenses, etc.), depending on the particular configuration of the phase element. In the embodiment of FIG. 2B, the expanded Gaussian beam 22GE is incident upon the active phase element APE, which defines the hollow beam 22H. This hollow beam is then directed to the phase plate PP, which forms the annular vortex beam 22A. In an example, lenses L1 and L2 can reside on opposite sides of the phase plate PP in a Fourier arrangement with the active phase element APE or the phase plate PP as discussed in connection with FIG. 1A. Other configurations of the phase element 50 can be employed, such as a single phase plate PP or an active phase element APE that is encoded with the axicon properties that define a hollow beam.

The method of operation of the beam-forming system 10B of FIG. 2A is similar to that of FIG. 1A. As noted above, the input Gaussian beam 22G can be expanded by the beam expander 40 to form the expanded Gaussian beam 22GE. The expanded Gaussian beam 22GE is incident upon the phase device 60. The expanded Gaussian beam 22GE is then converted into the phase-modulated hollow beam 22H'. The phase-modulated hollow beam 22H' is then focused at the focal plane FP (which is defined by the back focal plane F2B of lens L2) by the lens L2 as described above in connection with the embodiment of FIG. 1A to form the annular vortex beam 22A.

Example Glass-Based Object and Support Stage

Figure 3A:
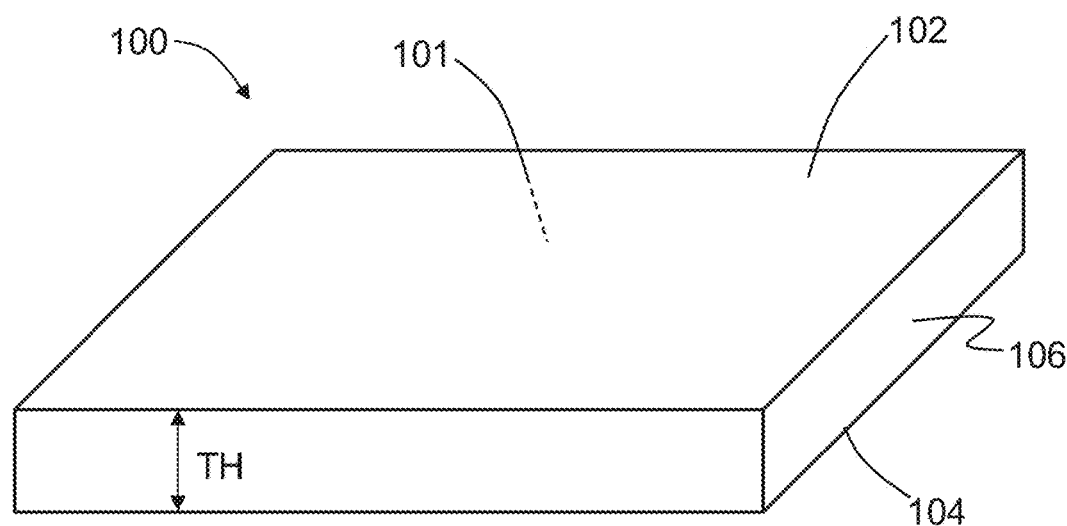
FIG. 3A is an elevated view of an example glass-based object having a planar configuration.

FIG. 3A is an elevated view of an example glass-based object ("object") 100 that can be disposed at the focal plane FP to form from the beam-forming system 10B a micro-hole-forming system in anticipation of forming micro-holes in the object, as explained in greater detail below. In an example, the object 100 has a body 101 that defines a front surface 102, back surface 104, sides 106. The body 101 has a thickness TH. In an example, the object 100 is a planar as shown so the thickness TH is substantially constant. In an example, the thickness TH can range from 0.3 mm to 2 mm. It is noted that the object 100 need not be planar and can have any reasonable shape and/or size and/or thickness amenable to forming micro-holes using the systems and methods described herein.

Figure 3B:
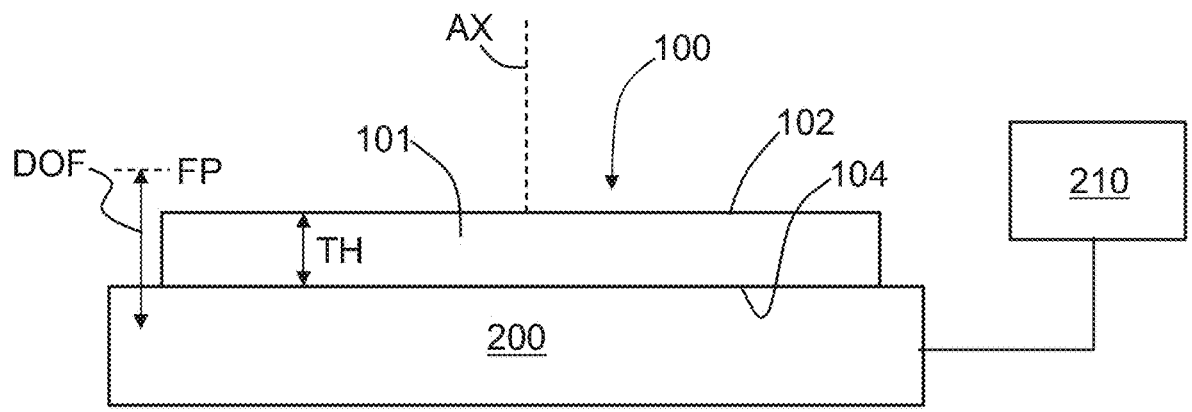
FIG. 3B is a side view of the planar glass-based object of FIG. 3A as operably supported by a movable support stage.

FIG. 3B is a schematic side view of the object 100 supported by a movable support stage 200. The object 100 is shown resting on an upper surface 202 of the movable support stage. The movable support stage 200 can be operably connected to a stage controller 210 configured to control the movement of the support stage and thus the object 100 supported thereby.

Figure 3C:
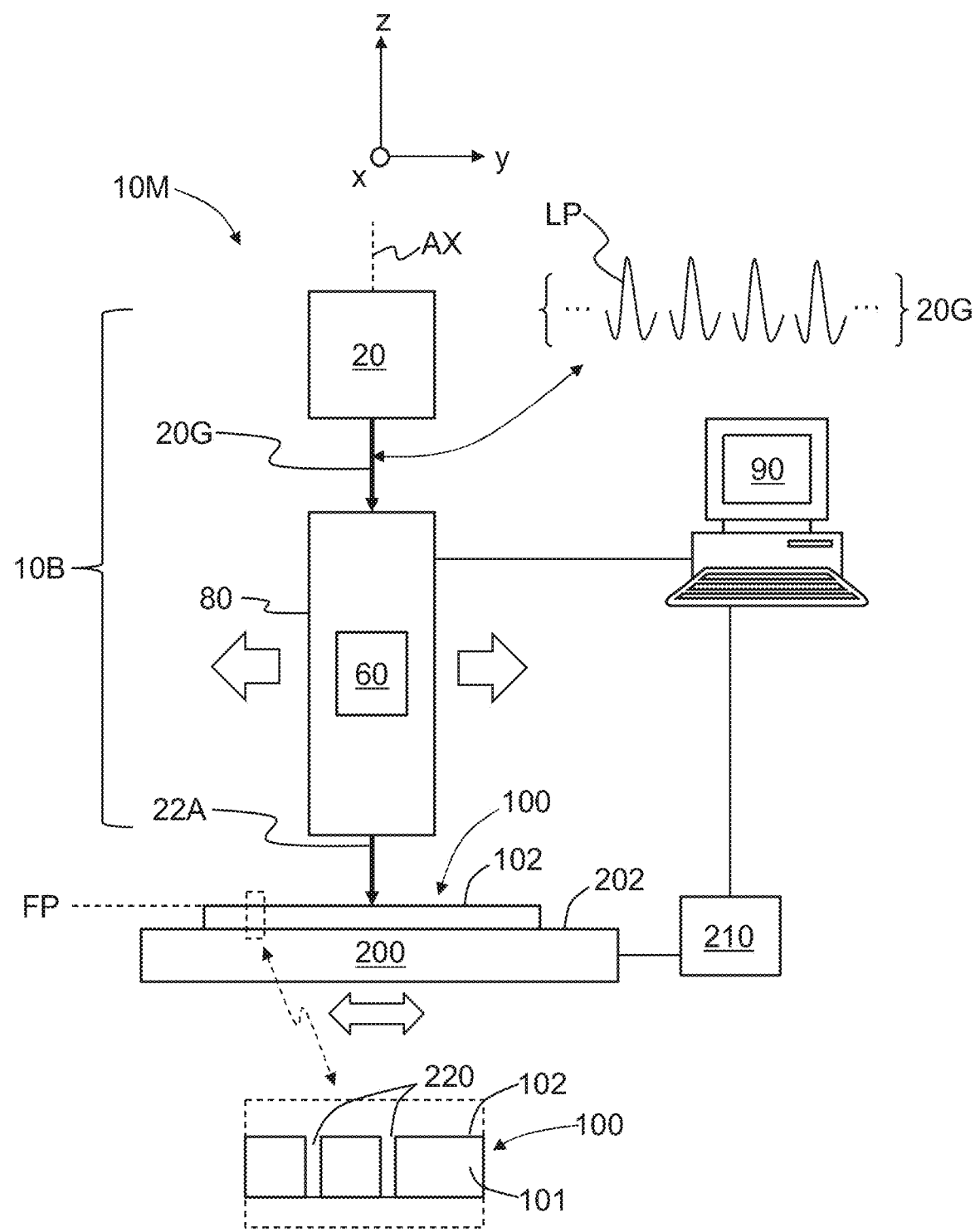
FIG. 3C is a schematic diagram of an example micro-hole-forming system that includes the beam-forming system along with the movable support stage and a controller that controls the operation of the micro-hole-forming system.

FIG. 3C is a schematic diagram of a micro-hole-forming system 10M that utilizes the beam-forming system 10B of either FIG. 1A or FIG. 2A, along with the moveable support stage 200. The micro-hole-forming system 10M is shown by way of example as arranged in a vertical configuration and includes the movable support stage 200 with the object 100 support thereon in a horizontal orientation. A horizontal orientation of the micro-hole-forming system 10M can also be used.

The micro-hole-forming system 10M includes a main controller 90 operably connected to the optical system 80 and to the stage controller 210. The main controller 90 is configured to control the overall operation of the micro-hole-forming system 10M. In an example where the phase device 60 comprises an active phase element APE, the main controller 90 can be connected to the APE controller (FIG. 2B) and provide instructions thereto for configuring the active phase element. The main controller 90 can comprise a computer, micro-computer, micro-controller, etc., configured to carry out instructions embodied in a non-transitory computer-readable medium (e.g., computer software or firmware) for carrying out the methods disclosed herein, including the micro-hole forming methods discussed in greater detail below.

Figure 3D:
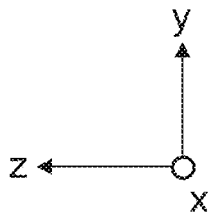
FIG. 3D is similar to FIG. 1C and shows the annular vortex beam passing through a portion of the body of the glass-based object, and illustrating an example where the glass-based object resides entirely within the depth of focus of the annular vortex beam.
Figure 3D:
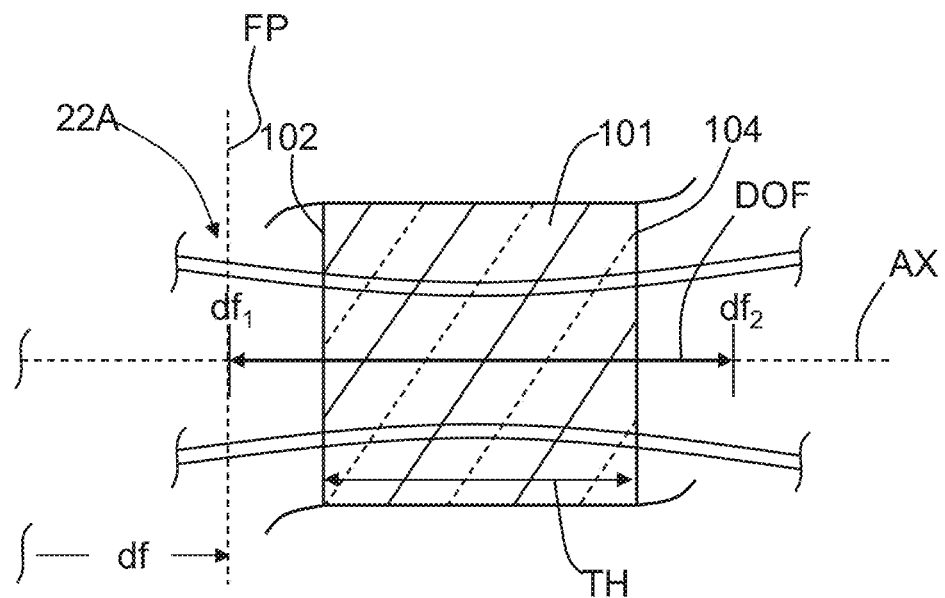

FIG. 3D is similar to FIG. 1C and shows an on-axis portion of the object 100 operably disposed within the micro-hole-forming system 10M, with the annular vortex beam 22A passing through the body 101 of the object. The moveable support stage 200 that supports the object is omitted for ease of illustration. FIG. 3D illustrates an example where the thickness TH of the object 100 is less than the depth of focus DOF of the annular vortex beam 22A (as shown between $df_1$ and $df_2$), or said differently, the object 100 resides entirely within the depth of focus DOF.

Beam Formation Simulations and Experimental Results

The phase distribution $\phi_{PD}(r,\theta)$ of the phase device 60 can be expressed as $$\phi_{PD}(r,\theta)=\phi_1(r,\theta)+\phi_2(r,\theta)=-k\cdot r\cdot\sin(\gamma)+m\cdot\theta \qquad \text{[Equation 1]}$$

where $\phi_1(r,\theta)$ is a first phase term and is equal to $=-k\cdot r\cdot\sin(\gamma)$ and $\phi_2(r,\theta)$ is a second phase term equal to $m\cdot\theta$, where k is the wave vector in a vacuum, r is the radial polar coordinate, $\theta$ is the angular polar coordinate, $\gamma$ is the aforementioned axicon angle and m is the Bessel order or the topological charge, which is an integer and in an example can be in the range $3\leq m\leq 20$. The first phase term $\phi_1(r,\theta)$ in the Equation 1 is the phase distribution associated with the axicon lens 30 that creates a hollow beam 22H, while the second phase term $\phi_2(r,\theta)$ is the azimuthal phase distribution that gives the annular vortex beam its vortex property.

In one example such as shown in FIG. 1A, an axicon lens 30 is used to define the first phase term $\phi_1(r,\theta)$ in Equation 1 while a phase element 50 can have a phase distribution $\phi_{PE}(r,\theta)$ that defines just the second phase term $\phi_2(r,\theta)$ in Equation 1. In another example, the phase device 60 does not include an axicon lens 30, in which case both the first and second phase terms $\phi_1(r,\theta)$ and $\phi_2(r,\theta)$ of Equation 1 are incorporated into (i.e., defined by) the phase element 50 so that $\phi_{PD}(r,\theta)=\phi_{PE}(r,\theta)$. In this case, the axicon angle $\gamma$ is understood as not being from a separate axicon element 30 but instead is incorporated (phase encoded) into the phase element 50 with phase regions or features 51 that replicate the functionality of an axicon lens. In other words, the axicon angle $\gamma$ in this embodiment can be thought of as an effective axicon angle.

Because an axicon lens 30 has a simple conic configuration, it may be preferred in some embodiments to use the embodiment of the beam-shaping system 10B of FIG. 1A and define the hollow beam 22H using the axicon lens while relegating the vortex-forming (i.e., Bessel-beam features) to the phase element 50. This can make it easier to form the phase-element portion of the phase device 60.

Simulations of the operation of the beam-forming system 10B and the formation of the annular vortex beam 22A were carried out using computer modeling using to guide micro-hole fabrication experiments. Fourier-transform-based beam propagation simulations were carried out using math-based software (Python™ software from the Python Software Foundation, and MATLAB® software from Mathworks, Inc., Natick, Massachussetts), along with using raytracing software (OpticsStudio® lens design software from Zemax LLC, Kirkland, Washington) as a guide to determine approximate beam diameters.

Figure 4A:
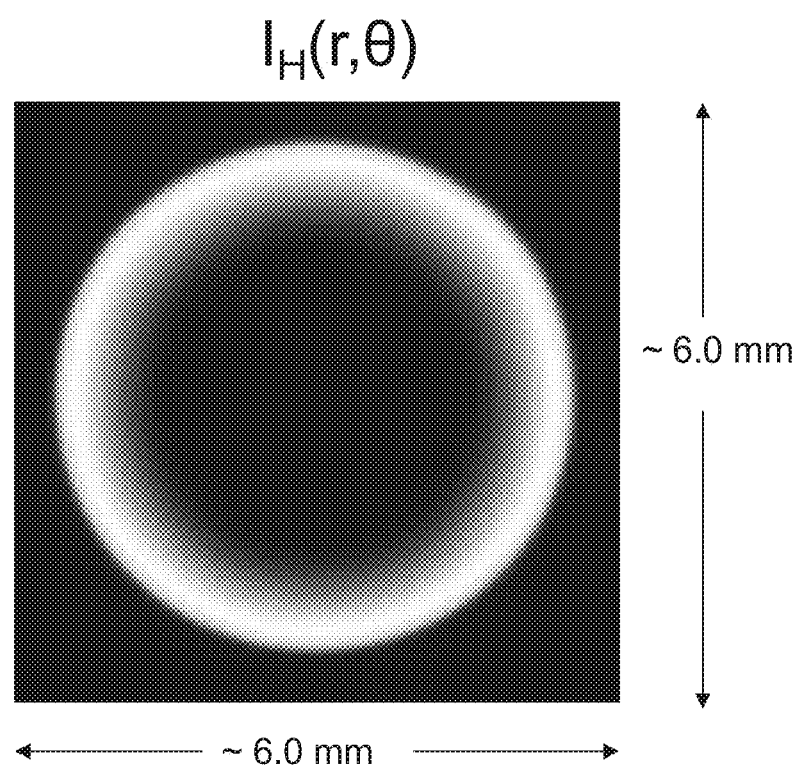
FIG. 4A shows an example simulated gray-scale intensity profile $I_H(r,\theta)$ of the hollow beam formed from the input Gaussian beam by the axicon lens.

FIG. 4A shows an example simulated intensity profile $I_H(r,\theta)$ of the hollow beam 22H as formed from the input Gaussian beam 22G by the axicon lens 30 and as incident upon the phase element 50. The axicon lens 30 had an axicon angle $\gamma=20°$. The lenses L1 and L2 had equal focal lengths f and were spaced apart by a distance $2f$ to define a Fourier configuration with respect to the phase element 50.

Figure 4B:
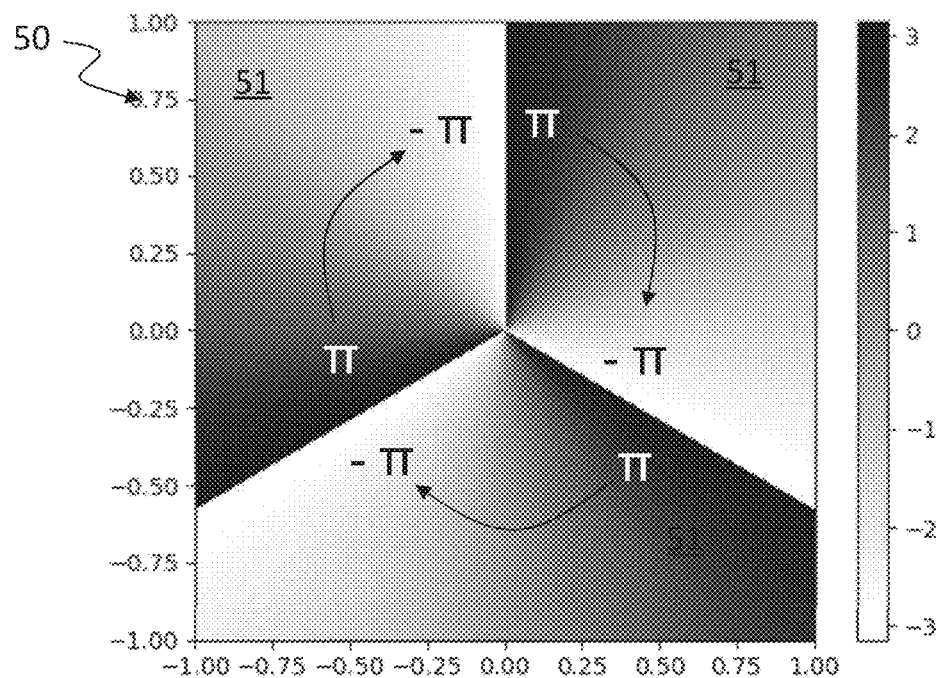
FIG. 4B is an example phase distribution $\phi_{PE}(r,\theta)$ for the phase element used in combination with the axicon lens to define the overall phase distribution $\phi_{PD}(r,\theta)$ for the phase device, wherein the phase distribution $\phi_{PE}(r,\theta)$ due to the phase element only is defined by an axicon angle $\gamma=0°$ and a topological charge m=3.

FIG. 4B is an example phase distribution $\phi_{PE}(r,\theta)$ for the phase element 50 used to form an example of the annular vortex beam 22A using the example configuration of the beam-forming system 10B of FIG. 1A The phase distribution $\phi_{PE}(r,\theta)$ is shown in gray scale, with a π phase represented by white and a –π phase represented by black, with gradations of gray representing the intermediate phase values. The axicon angle $\gamma=20°$ while the topological charge m=3.

Figure 4C:
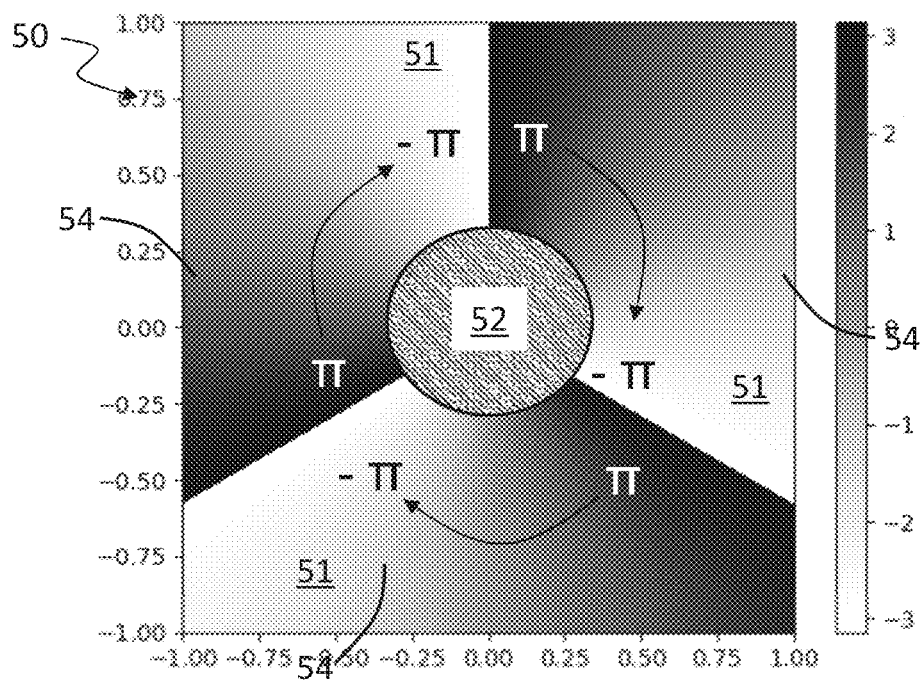
FIG. 4C is similar to FIG. 4A and illustrates an example where a central portion of the phase element is opaque so that the phase features that define the phase element are only formed in the outer portion.

FIG. 4C is similar to FIG. 4B and illustrates an example wherein a central portion 52 of the phase distribution is opaque (shown in cross-hatch) since the hollow beam 22H does not pass through the central portion of the phase element 50.

Figure 4D:
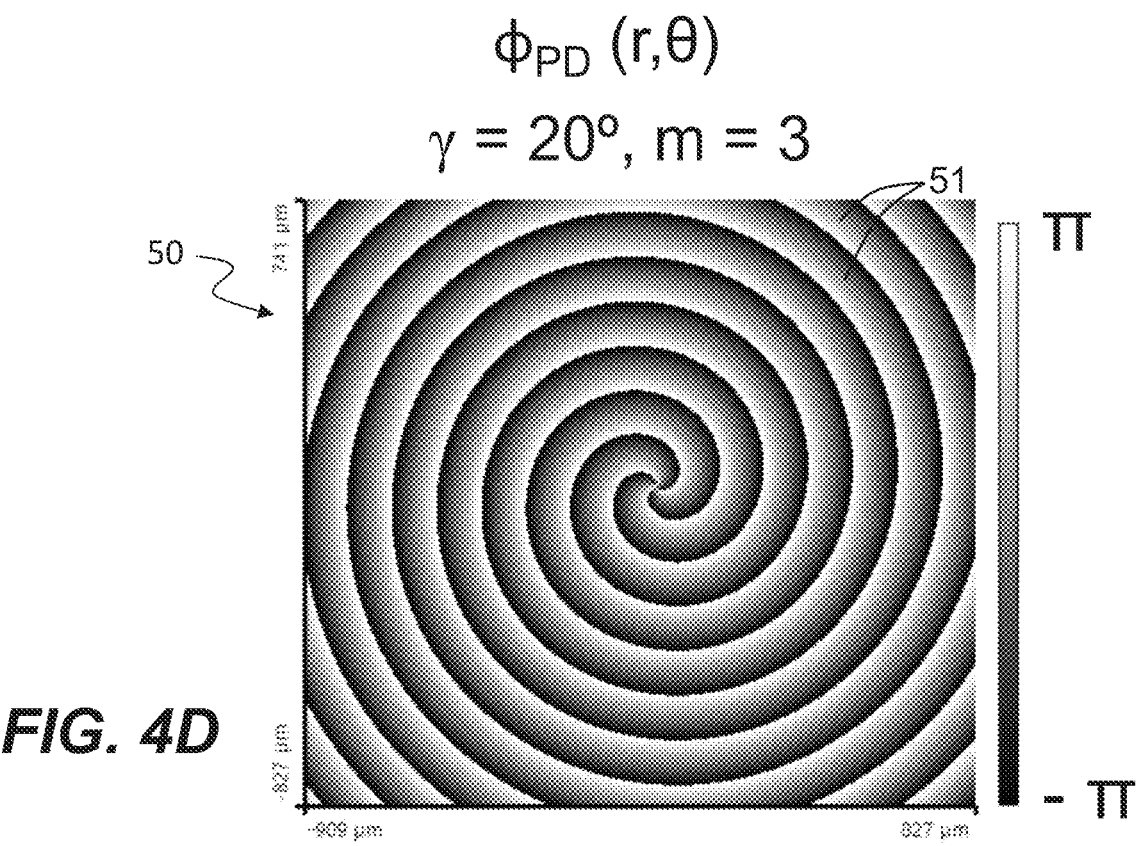
FIG. 4D is the gray-scale phase distribution $\phi_{PE}(r,\theta)$ of the phase device as defined by the combination of an axicon phase with an axicon angle $\gamma=20°$ and the phase plate of FIG. 4B having a topological charge of m=3.

FIG. 4D is the gray-scale phase distribution $\phi_D(r,\theta)$ of the phase device as defined by the axicon lens with an axicon angle $\gamma=20°$ and the phase plate of FIG. 4B having a topological charge of m=3 (and no encoded axicon angle, i.e., $\gamma=0°$). It is the same phase distribution that would need to be encoded onto a single phase element 50 of the beam-forming system 10B of FIG. 2A since there is no upstream axicon lens.

Figure 4E:
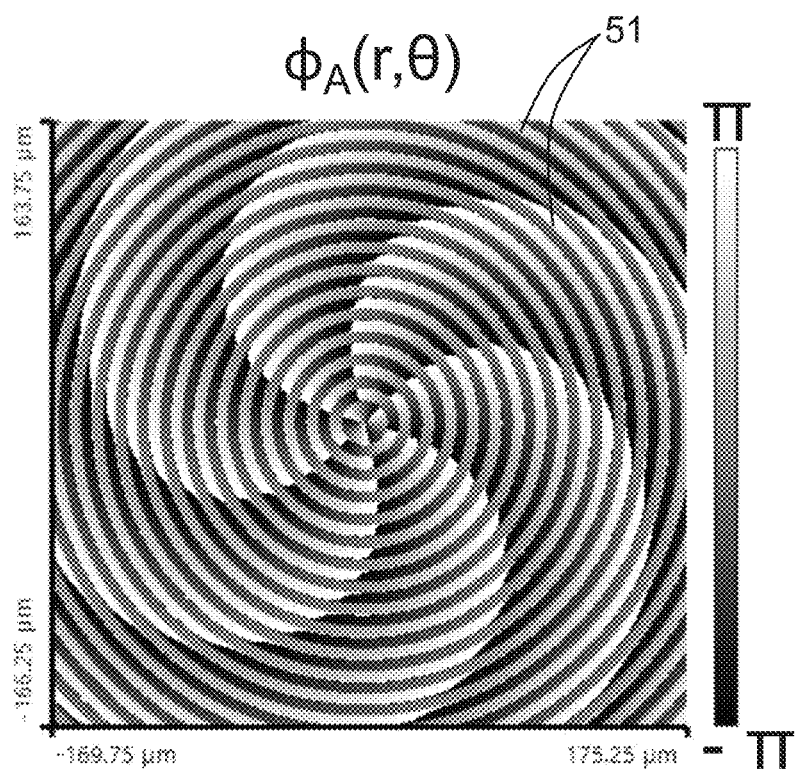
FIG. 4E is a simulated two-dimensional gray-scale image of an example phase distribution $\phi_V(r,\theta)$ of the annular vortex beam at the focus plane as formed by the phase distribution $\phi_{PD}(r,\theta)$ of the phase device of FIG. 4D.

FIG. 4E is a phase contour plot of the phase distribution $\phi_A(r,\theta)$ of the annular vortex beam 22A as formed at the focal plane FP at a distance of df=20 mm using the phase distribution $\phi_{PD}(r,\theta)$ of the phase device 60 of FIG. 4D The phase contours in FIG. 4E clearly show two distribution components, namely equally spaced concentric rings as defined by the axicon lens 30 and multiple spiral vortices, which are determined by topological charge m of the phase element 50.

Figure 5:
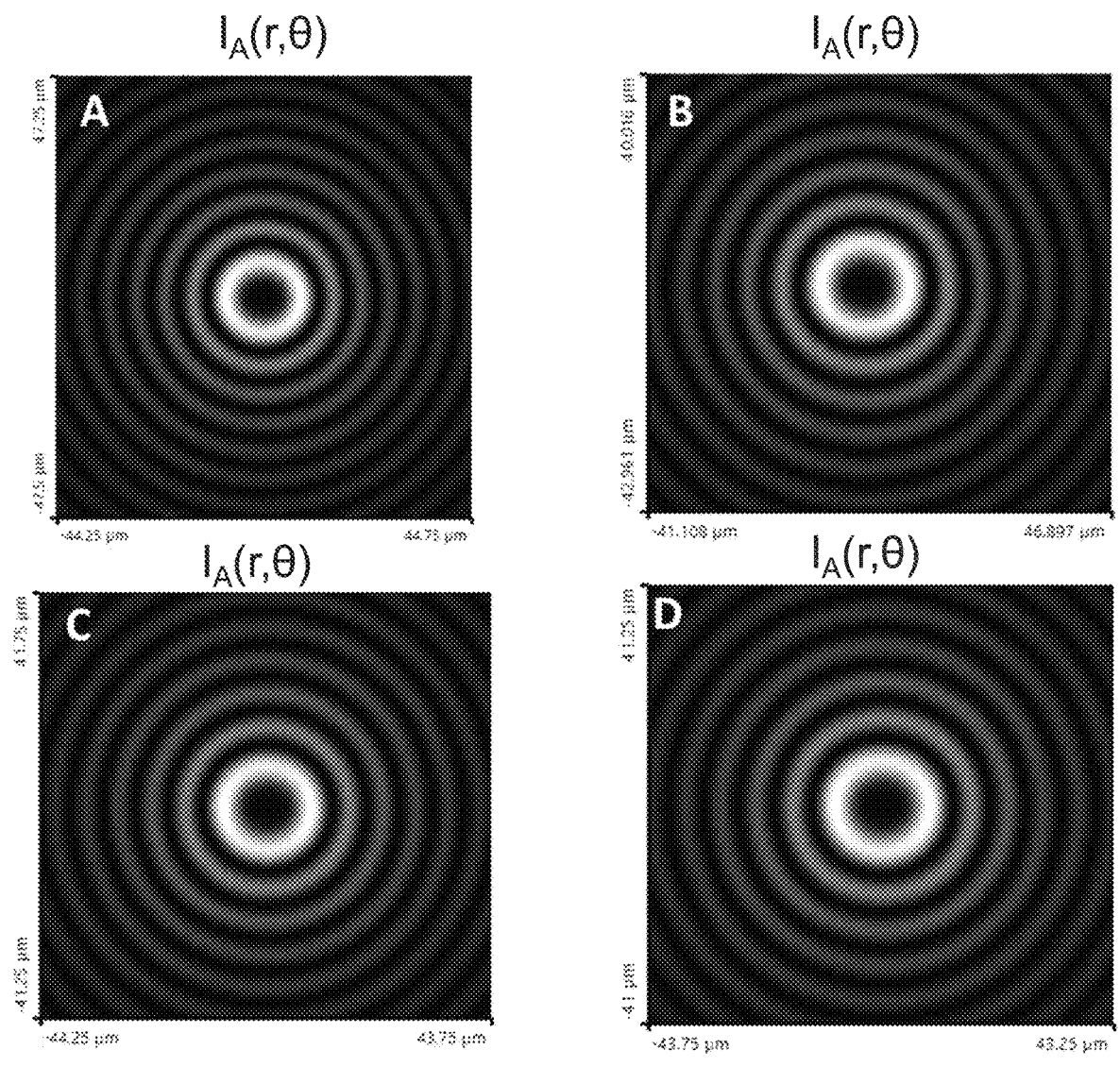
FIG. 5 shows four simulated images (A through D) of the intensity distribution $I_A(r,\theta)$ of the annular vortex beam and the focus ring therein at respective distances df of 18 mm, 19 mm, 20 mm and 21.5 mm for the beam-forming system 10B using the phase distribution $\phi_{PD}(r,\theta)$ of FIG. 4D.

FIG. 5 shows four simulated images (A through D) of the annular focus ring FR as defined by concentric-ring intensity profiles $I_A(r,\theta)$ computed at respective distances df of 18 mm, 19 mm, 20 mm and 21.5 mm for the beam-forming system 10B using the phase distribution $\phi_E(r,\theta)$ of FIG. 3B. The diameter D2 of focus ring FR (see FIG. 1D) is measured to be 16 μm, 17 μm, 17 μm and 18 μm, respectively. This is a variance in the diameter D2 of the focus ring FR of about 10% over a distance $\Delta df=3.5$ mm. The distance $\Delta df$ can be considered one measure of the depth of focus DOF of the example configuration of the beam-forming system 10B, wherein the diameter D2 does not vary by more than 10% or some other select percentage tolerance, such as 7.5% or 5%.

In some cases, it may be desirable to adjust the diameter D2 of the focus ring FR formed by the annular vortex beam 22A. In examples, this can be done by swapping the focusing lens L2 with another focusing lens L2 having a different focal length, or by changing the phase distribution $\phi_{PE}(r,\theta)$ of the phase element 50. When replacing the focusing lens L2, it may be necessary to change the first lens L1 and reposition the new second lens L2 or both of lenses L1 and L2. When changing the phase element 50, there is generally no need to reconfigure (e.g., reposition) the other components in the beam-forming system 10B.

Figure 6:
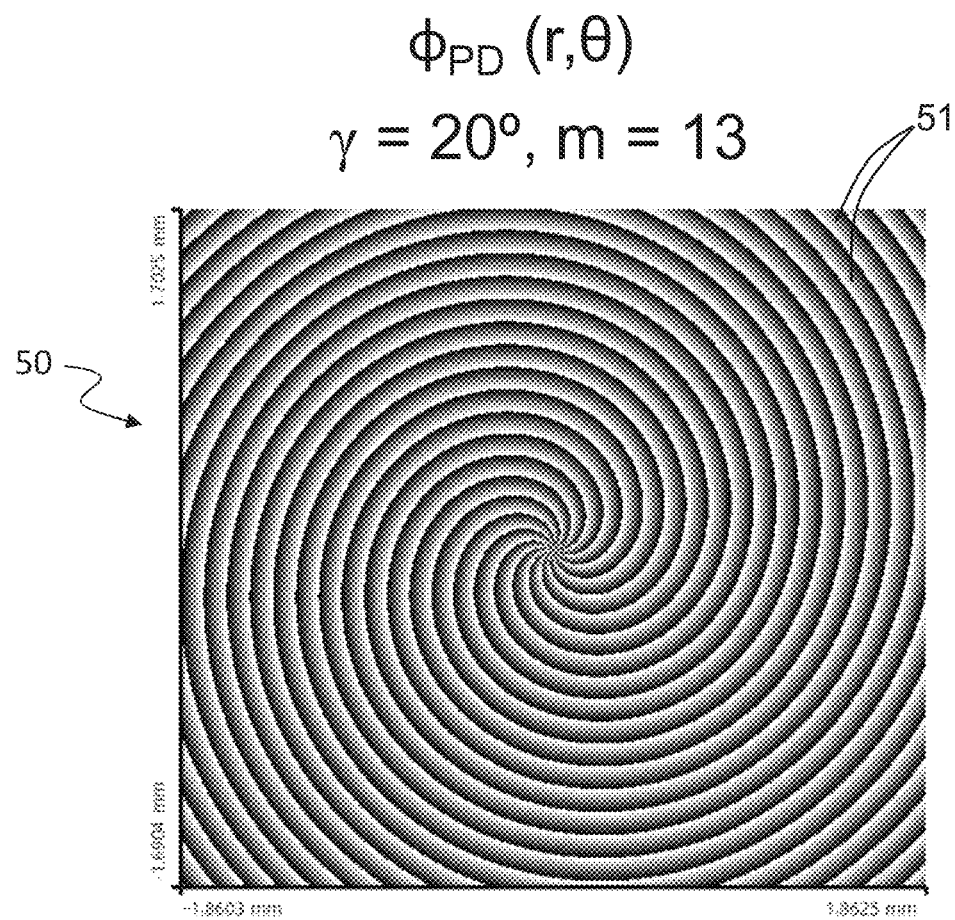
FIG. 6 is an example phase distribution $\phi_{PD}(r,\theta)$ for a phase device 60 wherein angle $\gamma=20°$ and m=13.

In an example, the diameter D2 of the focus ring FR can be increased by increasing the value of the topological charge m used to define the phase distribution $\phi_{PE}(r,\theta)$ of the phase element 50. FIG. 6 is a plot of the phase distribution $\phi_{PD}(r,\theta)$ of the phase device 60 with an axicon angle $\gamma=20$ and a topological charge m=13. This change in the topological charge increases the diameter D2 of the focus ring FR by about a factor of 3× as compared to the example above where m=3.

Figure 7:
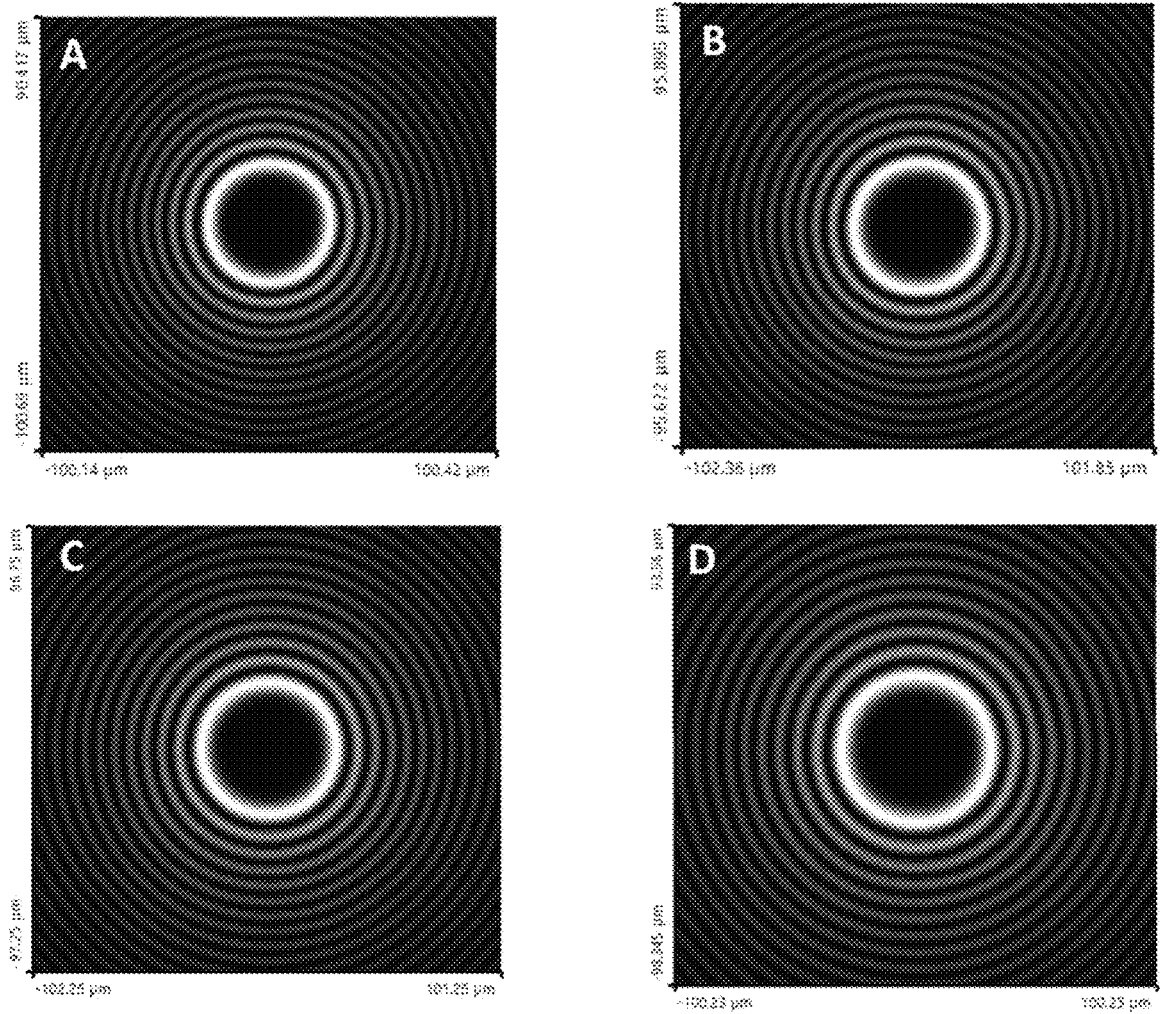
FIG. 7 is similar to FIG. 5 and shows four simulated images (A through D) of the intensity distribution $I_A(r,\theta)$ of the annular vortex beam and the focus ring therein at respective distances df of 18 mm, 19 mm, 20 mm and 21.5 mm for the beam-forming system of FIG. 2A using the phase distribution $\phi_{PD}(r,\theta)$ of FIG. 6, wherein the focus rings of FIG. 7 are substantially larger than those of FIG. 5 due to the larger topological charge.

FIG. 7 shows four simulated images (A through D) of the annular focus ring FR defined by the concentric-ring intensity profiles and computed at respective distances df of 18 mm, 19 mm, 20 mm and 21.5 mm for simulating using the phase distribution $\phi_{PD}(r,\theta)$ of FIG. 6 in the beam-forming system 10 of FIG. 2A (i.e., no axicon lens 30). The diameter D2 of focus ring FR is measured to be 54 μm, 56 μm, 58 μm and 61 μm, respectively. This is a variance in the diameter D2 of the focus ring FR of about 10% over a distance $\Delta df=3.5$ mm. The distance $\Delta df$ can be considered one measure of the depth of focus DOF of the example configuration of the beam-forming system 10B, wherein the diameter D2 does not vary by more than 10% or by another select percentage tolerance, such as 7.5% or 5%.

The ability to change the diameter of the focus ring FR by changing the phase distribution $\phi_{PE}(r,\theta)$ of the phase element 50 without adjusting the other beam-forming system parameters or components is advantageous for a flexible manufacturing system in which there is some amount of flexibility that allows the system to react in case of changes, whether predicted or unpredicted. As a result, a variety of objects 10 can be processed with a single micro-hole-forming system 10M.

Figure 8:
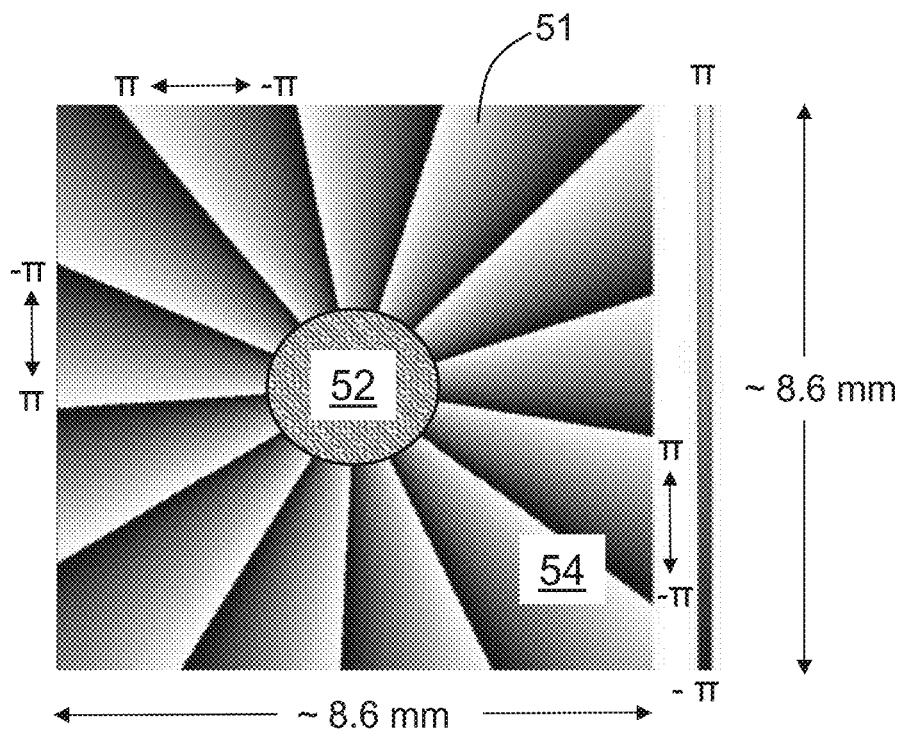
FIG. 8 is similar to FIG. 4C and shows an example of the phase distribution $\phi_{PE}(r,\theta)$ of the phase element of the phase device, wherein angle $\gamma=0°$ and m=13, and wherein the central portion of the phase element is opaque.

FIG. 8 is an example plot of the phase distribution $\phi_{PE}(r,\theta)$ of an example phase element 50 for use in the beam-forming system of FIG. 1A, wherein the axicon angle $\gamma=0$ and the topological charge m=13, so that the phase distribution is defined only by the topological charge m. Note that like in FIG. 4C, the center (on-axis) portion 52 of the phase distribution $\phi_{PE}(r,\theta)$ is not required and can be made opaque (shown in cross-hatch) since a hollow beam 22H incident on the phase element 50 and as formed by the upstream axicon lens 30 does not pass through the center portion. This is an advantageous feature of the phase element 50 since fabricating the central portion 52 of the phase element typically requires forming phase features 51 having relatively high spatial frequencies (e.g., on the order of a micron) as compared to the remaining outer portion 54 (e.g., on the order of ten microns). Not having to form high-resolution phase features 51 saves time and cost to the manufacturing process used to form the phase element 52. Additionally, the singularity at the center 52 of the phase element 50 would prevent any manufacturing process from being able to reproduce the desired phase exactly.

Figure 9:
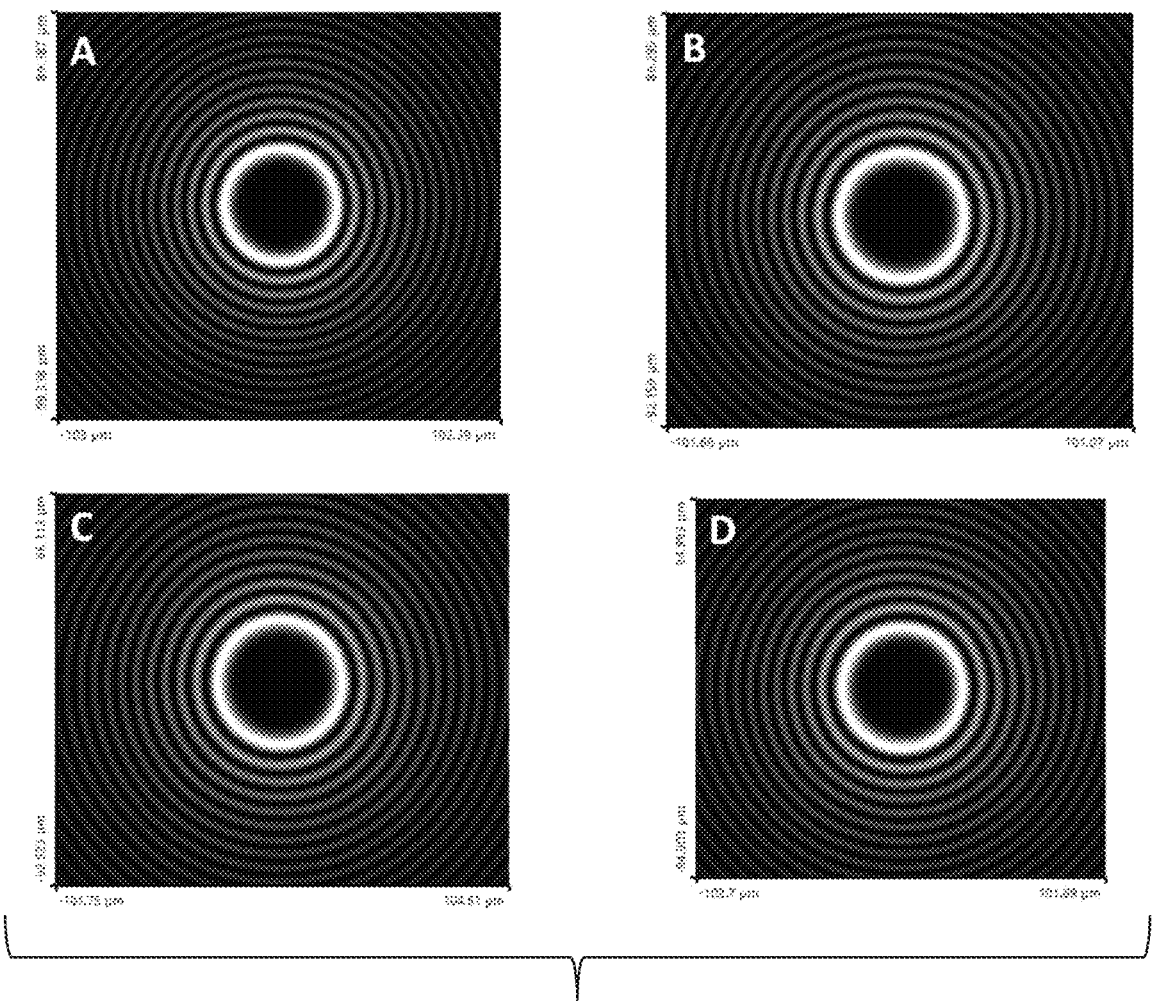
FIG. 9 is similar to FIGS. 5 and 7 and shows four simulated images (A through D) of the intensity distribution $I_A(r,\theta)$ of the annular vortex beam and the focus ring therein at respective distances df of 18 mm, 19 mm, 20 mm and 21.5 mm for the beam-forming system using the phase distribution $\phi_{PD}(r,\theta)$ of FIG. 6 and the beam-forming system of FIG. 1A.

FIG. 9 shows four simulated images (A through D) of the annular focus ring FR defined by the concentric-ring intensity profiles and computed at respective distances df of 18 mm, 19 mm, 20 mm and 21.5 mm for simulating using the phase distribution $\phi_{PE}(r,\theta)$ of FIG. 8 in the beam-forming system of FIG. 1A. The diameter D2 of focus ring FR is measured to be 53 μm, 55 μm, 58 μm and 60 μm, respectively. This is a variance in the diameter D2 of the focus ring FR of about 10% over a distance $\Delta df=3.5$ mm. The distance $\Delta df$ can be considered one measure of the depth of focus DOF of the example configuration of the beam-forming system 10B, wherein the minimum diameter $D2_{MIN}$ does not vary by more than 10% or by another select percentage tolerance, such as one in the percentage ranges set forth above.

Note that the simulated images A through D of FIG. 7 uses a combination of the phase element of FIG. 8 along with an upstream axicon lens 30 to form the hollow beam 22H using the configuration of the beam forming system 10B of FIG. 1A, while the simulated images A through D of FIG. 9. were formed using a single phase element 50 that encodes both the axicon angle γ and the topological charge m per using the configuration of the beam forming system 10B of FIG. 2.

Forming Micro-Holes

An aspect of the disclosure is directed to using the micro-hole-forming system 10M of FIG. 3C to form the annular vortex beam 22A and use the annular vortex beam to form one or more micro-holes 220 in the object 100 (see close-up inset of FIG. 3C). Two main example methods are disclosed, namely a one-step method and a two-step method.

One-Step Method

Figure 10A:
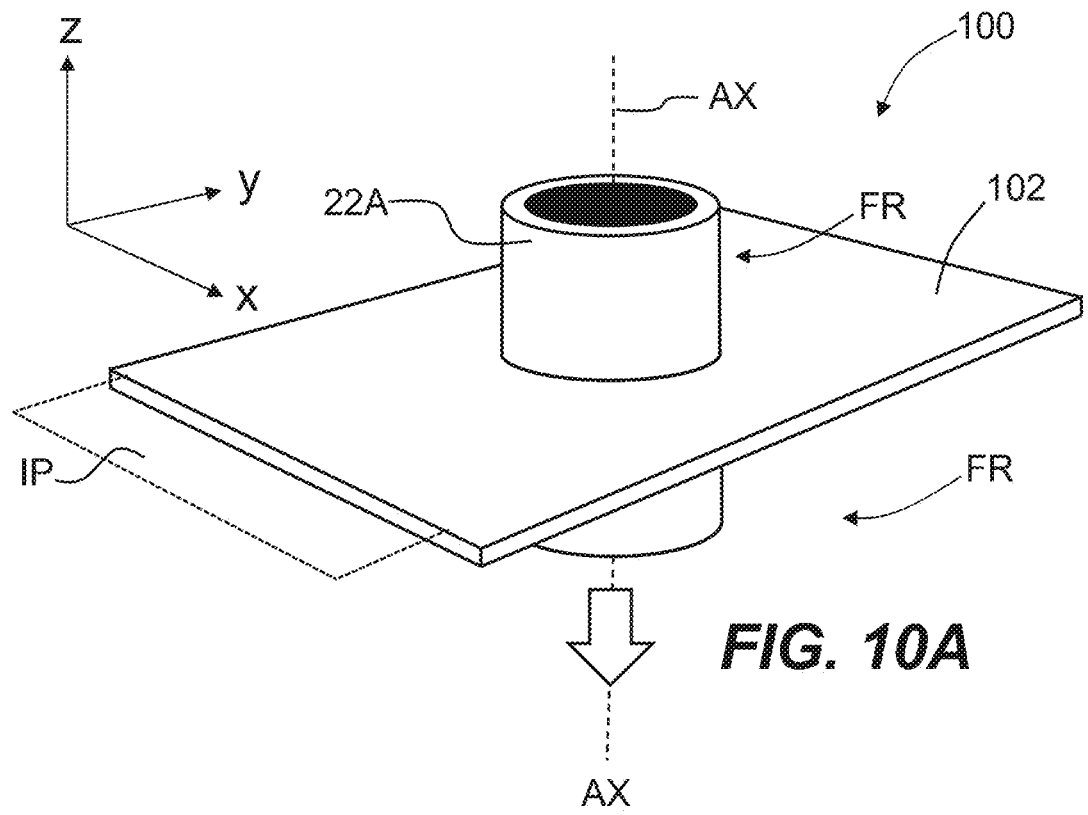
FIG. 10A is a close-up schematic diagram of the annular vortex beam as formed by the beam-forming system disclosed herein being directed through the body of the glass-based object in the direction of the arrow AR in the micro-hole-forming system.

FIG. 10A is a close-up schematic diagram of the annular vortex beam 22A as formed by the beam-forming system 10B disclosed herein being directed through the body 101 of the object 100 in the direction of the arrow AR in the micro-hole-forming system 10M. The object 100 is disposed at the image plane IP using the movable stage 200 (see FIG. 3C). Example amounts of laser power for the laser source 110 for objects 100 made of select materials are discussed below. The laser power of the laser source 110 is selected so that the power density (e.g. a peak intensity of 110 TW/cm$^2$) of the annular vortex beam 22A is sufficient to ablate the material of the object.

Figure 10B:
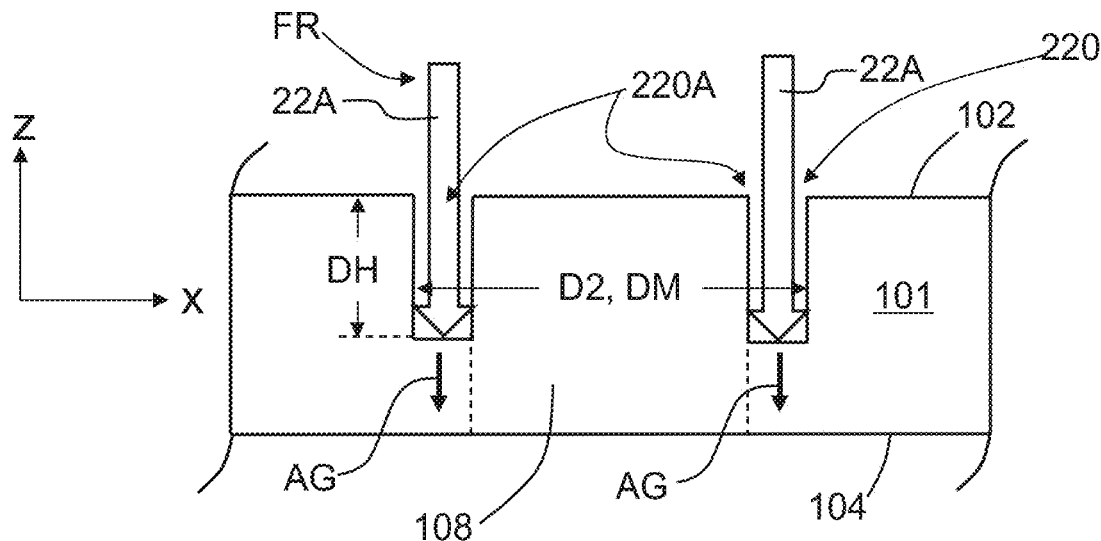
FIG. 10B is a close-up x-z view of the irradiated portion of the body of the glass-based object illustrating how the annular vortex beam is used to form an annular micro-hole by ablation.

The ablation process initially forms a closed-end annular micro-hole 220A, as shown in the close-up x-z cross-sectional view of FIG. 10B. The annular micro-hole 220 defines a cylindrical central portion 108 in the body 101 of the object 100. In an example, the micro-hole forming process stops here with the formation of the annular micro-hole 220A having a depth DH ("micro-hole depth") as measured from the front surface 102 of the object 100. The micro-hole (outer) diameter is DM and is substantially equal to the diameter D2 of the annular vortex beam.

Figure 13:
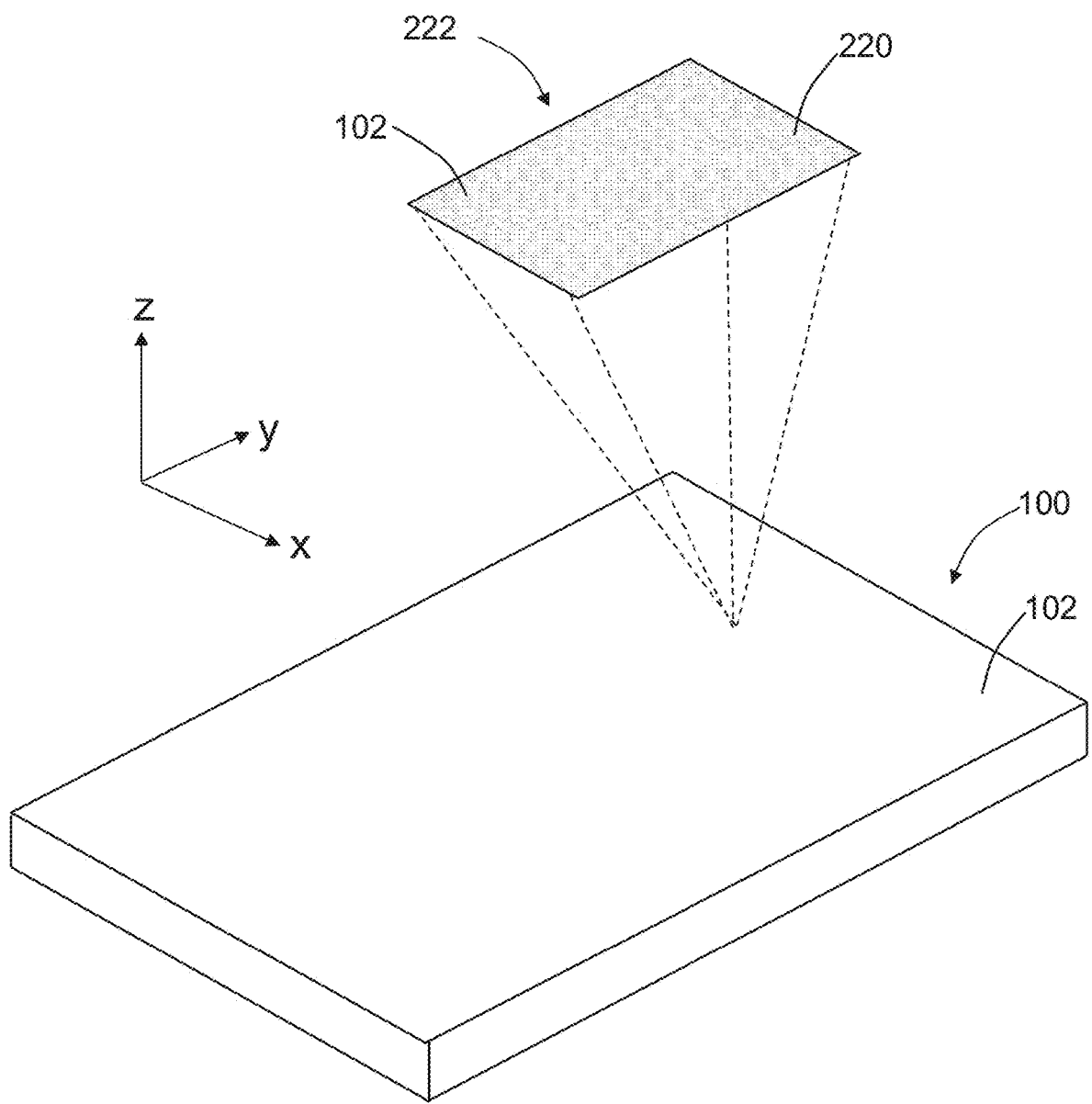
FIG. 13 is an elevated view of an example glass-based object showing in the close-up inset array of micro-holes formed in the glass-based object.

This one-step micro-hole-forming process can be repeated at other locations of the object 100 (e.g., by the controlled movement of the movable stage 200) to form an array of annular micro-holes (see FIG. 13). The micro-hole depth DH can be selected based on the power density of the annular vortex beam 22A and amount of time $t_E$ (exposure time) the annular vortex beam 22A irradiates the object 100. Because the exposure time $t_E$ and the power density of the annular vortex beam 22A can be carefully controlled (e.g., by controlling the number of light pulses LP incident upon the object 100), the micro-hole depth DH can also be carefully controlled, e.g. to within microns.

Figure 10C:
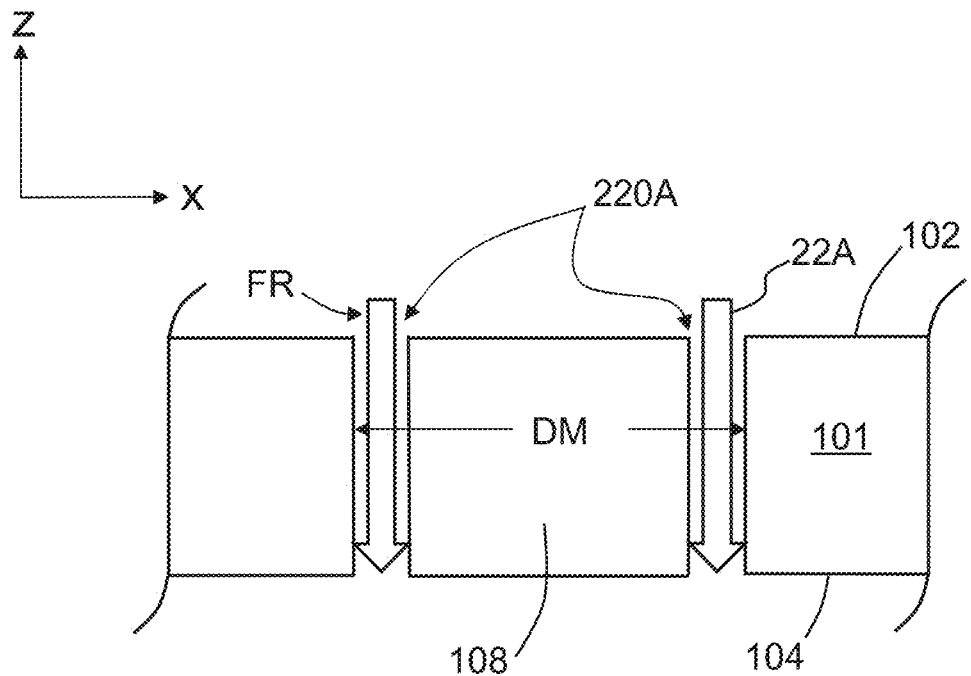
FIG. 10C is similar to FIG. 10B and illustrates an example where the irradiation by the annular vortex beam is carried out so that the annular hole extends through the body of the glass-based substrate and results in the formation of a substantially cylindrical through micro-hole via the removal of the central portion of the body.

In another example, the annular vortex beam 22A continues to irradiate the sample 10 so that the irradiated portion of the body 101 continues to be ablated, thereby causing the annular hole 220 to deepen (i.e., the micro-hole depth DH increases) towards the back surface 104 of the object 100, as illustrated by the growth arrows AG. This process continues until the annular micro-hole 220A reaches the back surface 104, as shown in FIG. 10C. At this point, the cylindrical central portion 108 detaches from the adjacent portions of the body 101. The detached cylindrical portion 108 either falls away on its own (e.g., when lifting the object 100 from the movable stage 200) or is removed (e.g., by the application of a vacuum that pulls out the cylindrical portion).

Figure 10D:
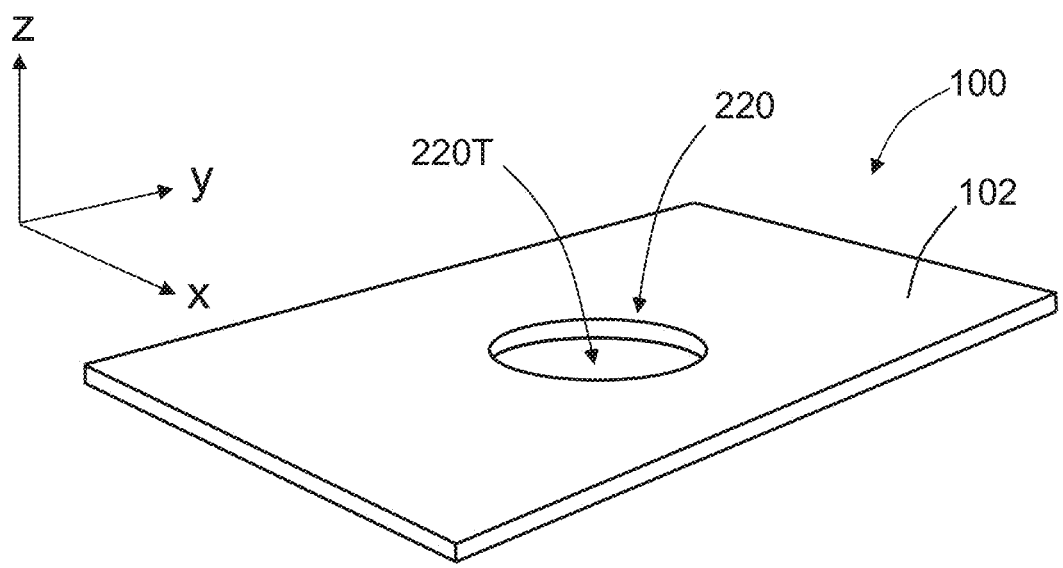
FIG. 10D is similar to FIG. 10A and shows the substantially cylindrical through micro-hole of FIG. 10C.

FIG. 10D is similar to FIG. 10A and shows the resulting micro-hole 220 formed as a through micro-hole 220T in the object 100 based on the one-step micro-hole-forming process. Here, the micro-hole depth DH is the same as the object thickness TH at the location where the through micro-hole 220T is formed. In an example, the through micro-hole 220T has a substantially cylindrical shape.

Figure 10E:
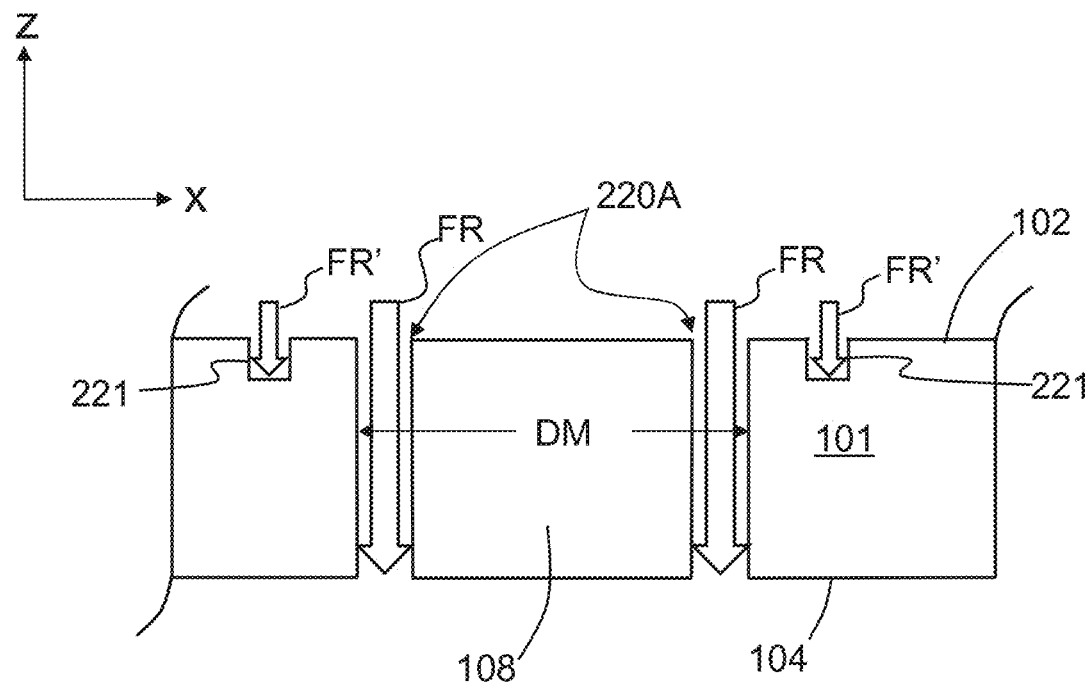
FIGS. 10E and 10F are similar to FIGS. 10C and 10D and illustrate an embodiment where the secondary focus ring is used to create an annular recess in the front surface of the object that is concentric with the through hole.
Figure 10F:
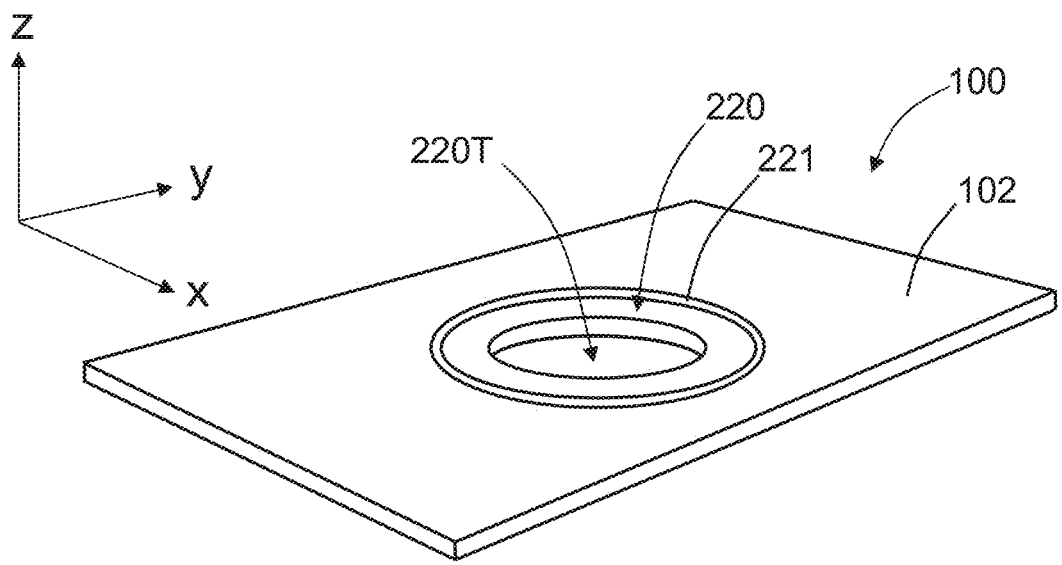

FIGS. 10E and 10F are similar to FIGS. 10C and 10D and illustrate an embodiment where the secondary focus ring FR' is used to create an annular recess 221 in the front surface 102 of the object 100 and concentric with the through micro-hole 220T. The annular recess 221 can serve as a location for debris collection and can also create surface texture.

Figure 10G:
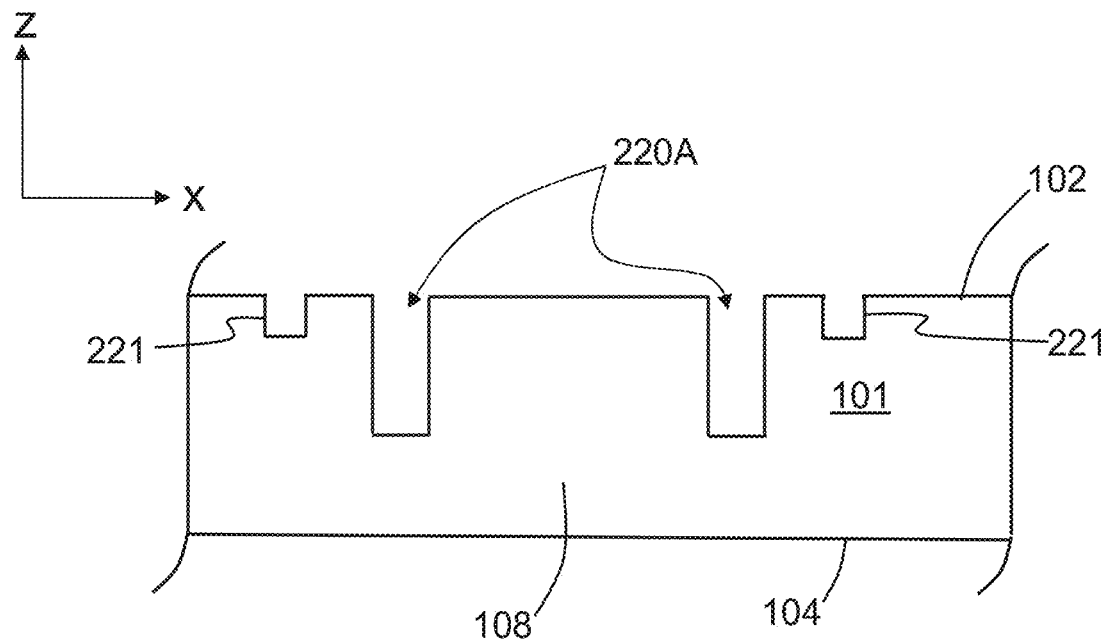
FIGS. 10G and 10H are similar to FIG. 10E and illustrates example embodiments where an annular micro-hole is formed instead of a through micro-hole, and wherein the annular micro-hole and annular recess can have different relative depths.
Figure 10H:
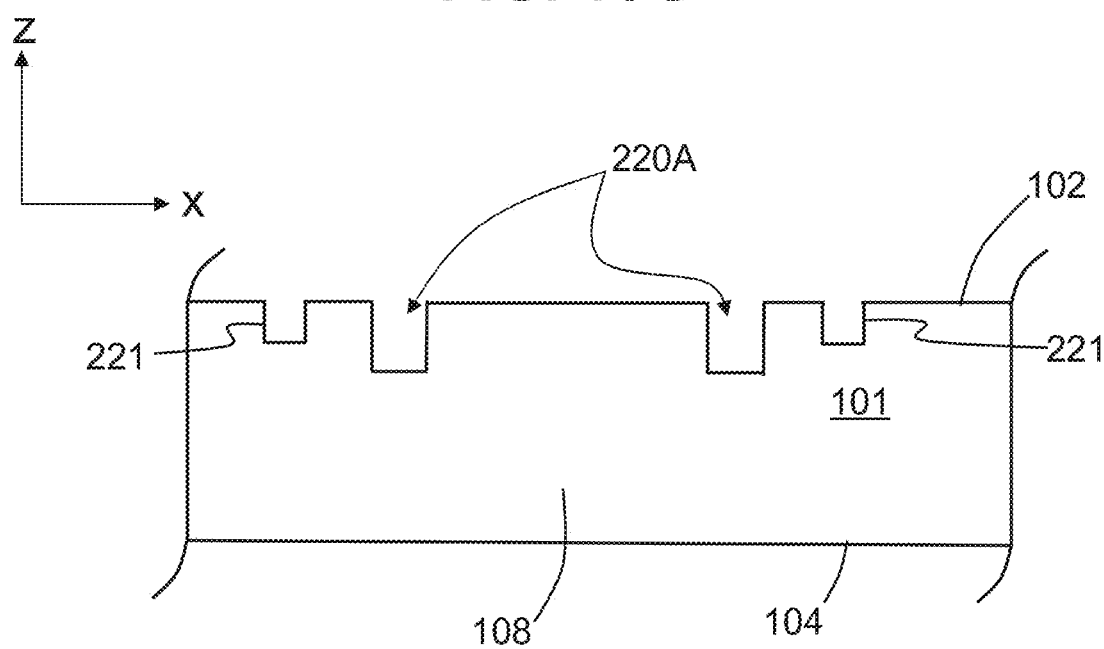

FIG. 10G is similar to FIG. 10E and illustrates an example embodiment where an annular micro-hole 220A is formed instead of a through micro-hole 220T. In this embodiment, the annular recess 221 is concentric with the annular micro-hole 220A. FIG. 10H is similar to FIG. 10G and shows that the annular micro-hole 220A and the annular recess 221 can have a variety of different relative sizes, including having substantially the same size.

Figure 11A:
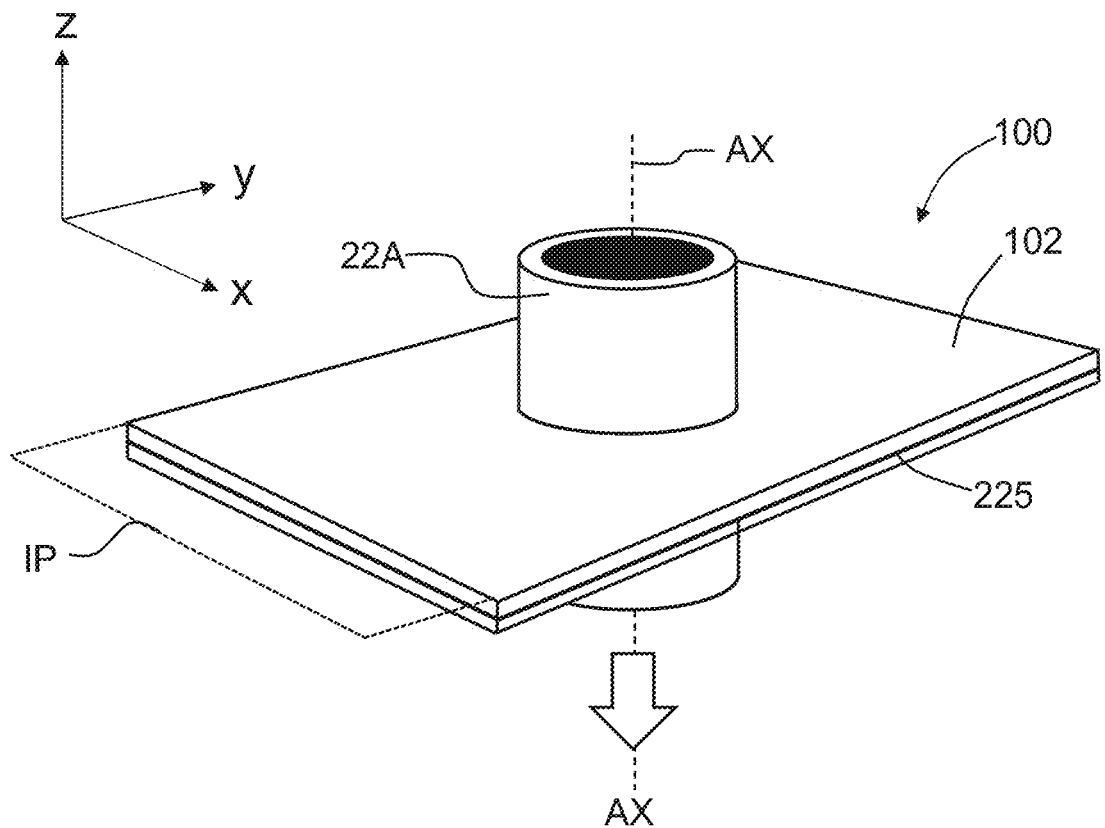
FIGS. 11A and 11B are similar to FIGS. 10A and 10D and illustrate an embodiment where multiple glass-based objects can be process in a stacked configuration to form micro-holes in each of the glass-based objects.
Figure 11B:
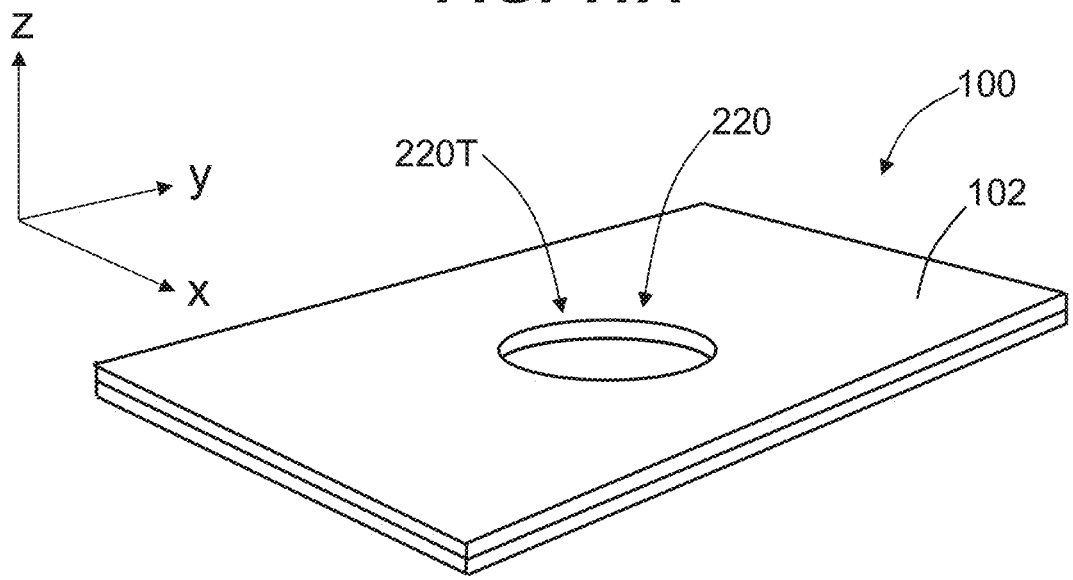

FIGS. 11A and 11B are similar to FIGS. 10A and 11D and illustrate an embodiment where multiple objects 100 can be process in a stacked configuration to form micro-holes 220 in each of the objects. In an example shown in FIG. 11A, an index-matching fluid 225 can be disposed between the confronting surfaces of the two example stacked objects 100 to reduce reflections that in turn can reduce the intensity of the annular vortex beam 22A as it enters the lowermost object in the stack.

The stacking embodiment of the method can be used to increase throughput of processed objects 100. The stacking embodiment is made possible due to the extremely large (long) depth of focus DOF, e.g., between 2 mm and 40 mm. This allows for the annular vortex beam 22A to form relatively uniform micro-holes 220 over multiple stacked objects 100. For example, for a depth of focus DOF of 2.5 mm, the stacking embodiment can accommodate four layers of objects 100 in the form of planar sheets each having a thickness of 0.6 mm. This results in a 4× increase in throughput as compared to processing a single planar sheet of thickness TH of 0.6 mm.

Two-Step Method

Figure 12A:
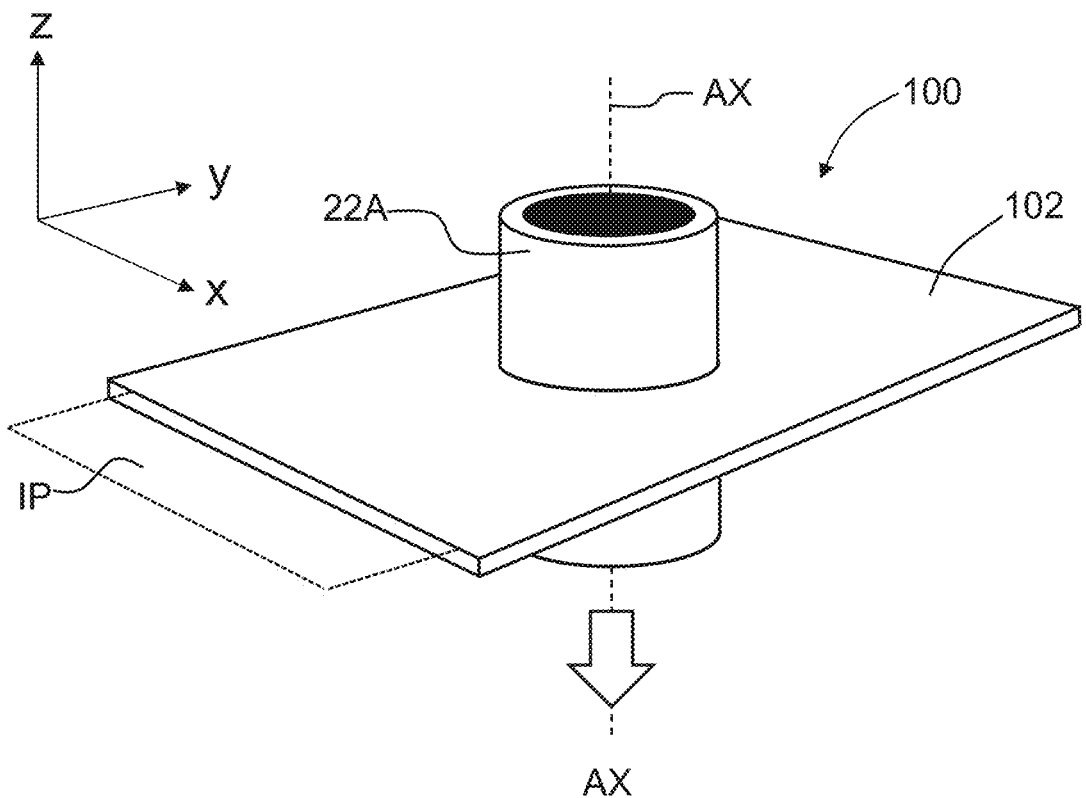
FIGS. 12A and 12B are similar to FIGS. 10A and 10D and illustrate an embodiment where the irradiation from the annular vortex beam is used to form an annular modified region in the body of the glass-based object.

FIGS. 12A through 12E illustrate an example two-step method for forming micro-holes 220. FIG. 12A is similar to FIG. 10A and illustrates the first step in the two-step process in which the annular vortex beam 22A of the micro-hole-forming system 10M irradiates the object 100 in the direction of the arrow AR. In this embodiment, the power density of the annular vortex beam 22A is less than that which is required to ablate the material that makes up the object 100.

Figure 12B:
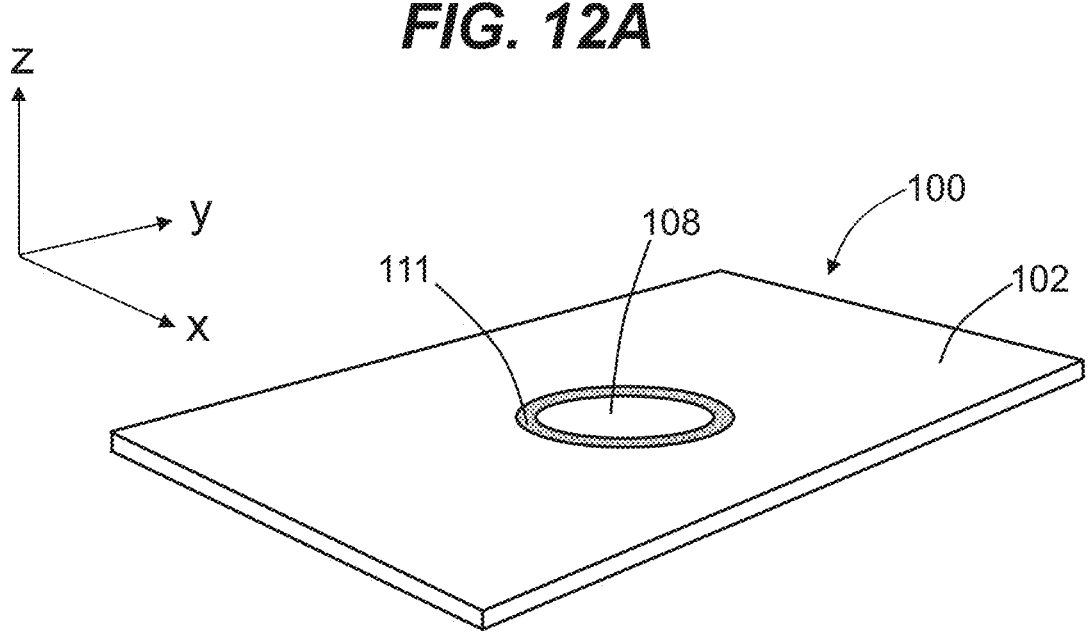
Figure 12C:
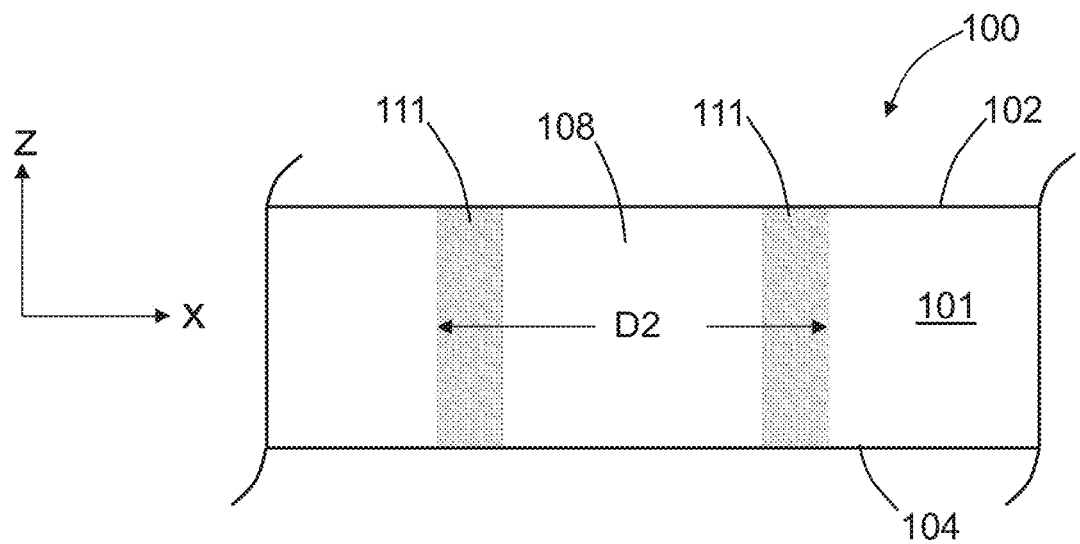
FIG. 12C is a close-up x-z cross-sectional view of the annular modified region formed in the body of the glass-based object.

With reference to FIG. 12B and to the close-up x-y cross-sectional view of FIG. 12C, the irradiation of the object 100 by the annular vortex beam 22A of FIG. 10A forms an annular modified region 111 within the body 101 of the object. The annular modified region 111 also defines a central portion 108 similar to that defined by the annular micro-hole 220A in the one-step embodiment, wherein the central portion 108 remains unmodified. The material of the body 101 in the annular modified region 111 undergoes a structural change that weakens the material relative to its original form. The structural changes can include the formation of voids and cracks, as well as a general densification of the material. This type of structural change renders the annular modified region 111 more amenable to etching than the surrounding unmodified regions, including the central portion 108. Note that the annular modified region 111 has an annular shape with a diameter that is substantially the same as the diameter D2 of the annular vortex beam 22A.

Figure 12D:
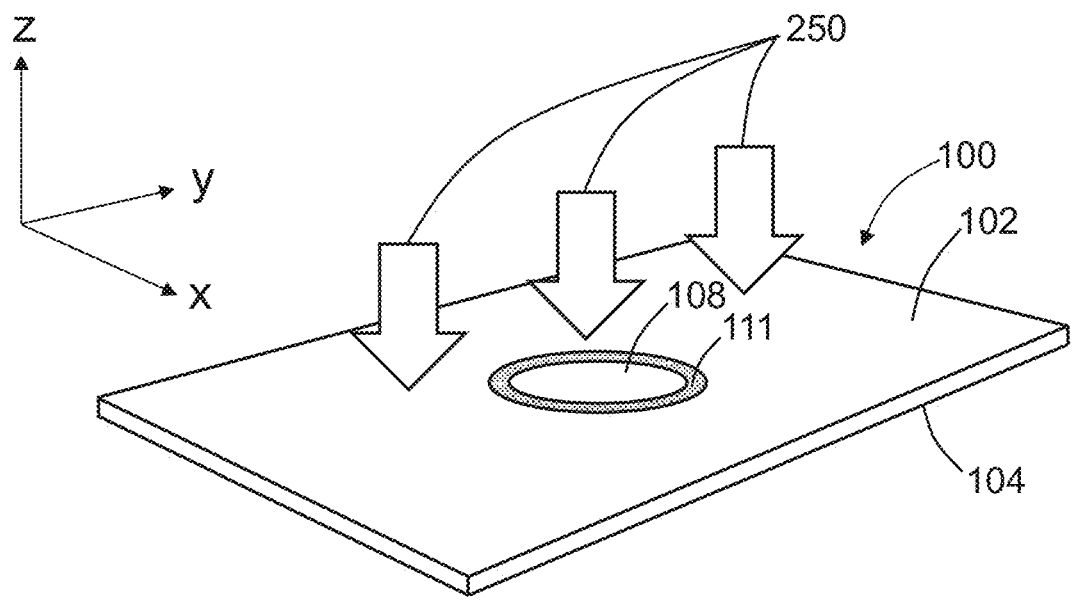
FIG. 12D is similar to FIG. 12B and illustrates the step of performing an etch process to remove the annular modified region

FIG. 12D illustrates the second step of the two-step process wherein the object 100 with the modified region 111 is subject to an etching process 250 to remove the material in the annular modified region. In an example, the etch process 250 comprises an acid etch. In an example, the acid etch process comprises immersing the irradiated object 100 of FIG. 12A in acid bath (solution) to remove the material in the annular modified region 111. As noted above, the annular modified region 111 etches much faster than the non-modified regions of the body 101 of the object 10. In an example, the etch process can include the use of ultrasound (e.g., an ultrasonic bath) and heat (via a heater) to increase the etch rate. In an example, the acid solution used as the etchant includes at least one of the following acids: HF, HCl. Further in the example, the acid solution can also include other acids, such as $HNO_3$, $H_2SO_4$.

As with the single-step method, the stacking embodiment can be used in the two-step method. In one example, the annular modified regions 111 are formed in the stacked configuration and the etching process 250 is also carried out in the stacked configuration. In another example, the stack can be separated into single objects 100 and then the etching process 250 carried out separately on each object.

Figure 12E:
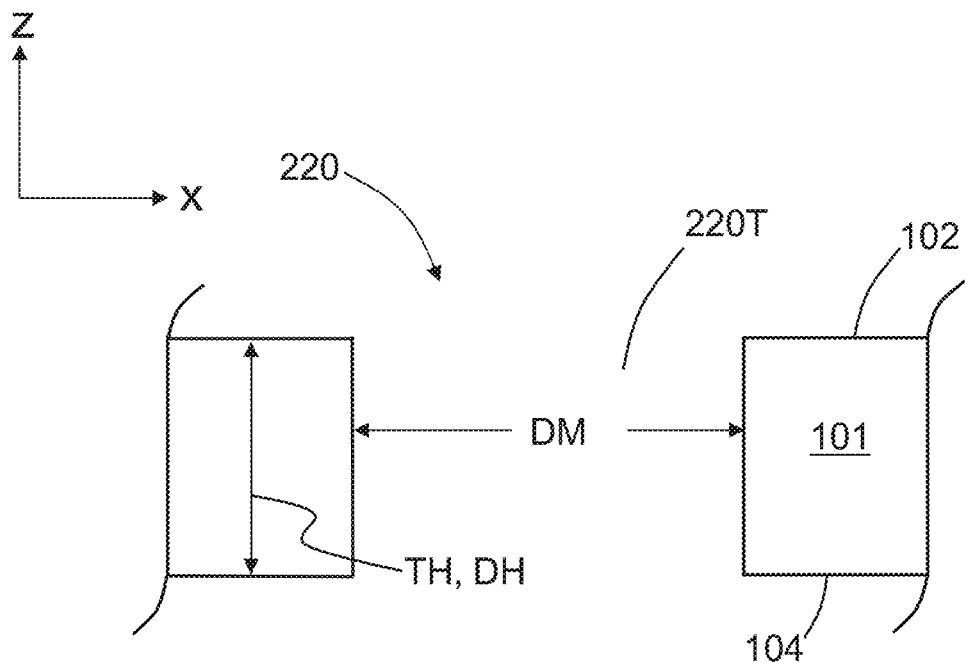
FIG. 12E is similar to FIG. 12C and shows the resulting through micro-hole as formed removal of the annular modified region along with the central portion due to the etching away of the annular modified region.
Figure 12F:
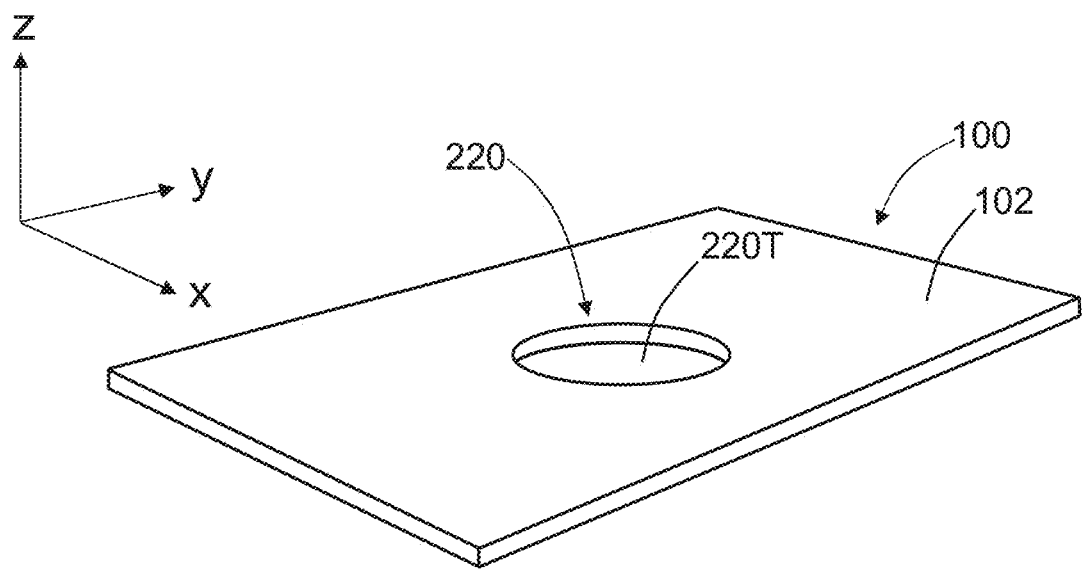
FIG. 12F is an elevated view of the glass-based object shows the resulting through micro-hole formed by the two-step method of irradiating with the annular vortex beam to form the annular modified region and then etching the annular modified region.

FIG. 12E is similar to FIG. 12C and shows the formation of the through micro-hole 220T when the central portion 108 is removed. The through micro-hole 220T has a width DM and a depth DH that is equal to the thickness TH of the object 100. FIG. 12F is an elevated view of the object 100 that shows the resulting through micro-hole 220T.

Figure 12G:
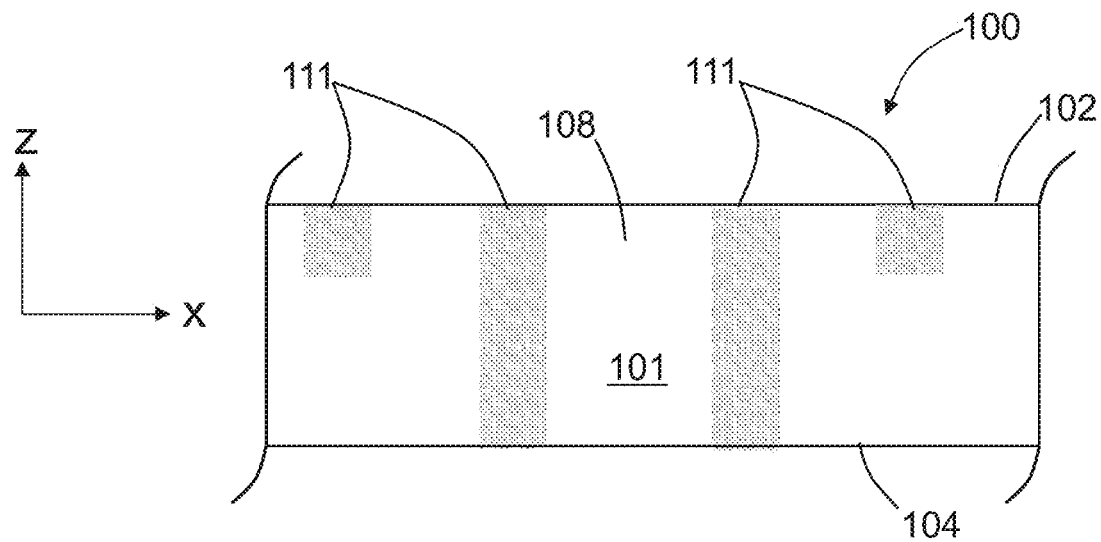
FIGS. 12G and 12H are similar to FIGS. 12C and 12D and illustrate an example where the main and secondary focus rings form concentric annular modified regions, wherein the outer annular modified region is formed by the secondary focus ring and does not reach to the back surface of the object so that the etch process can be used to form an annular recess that surrounds the central through micro-hole.
Figure 12H:
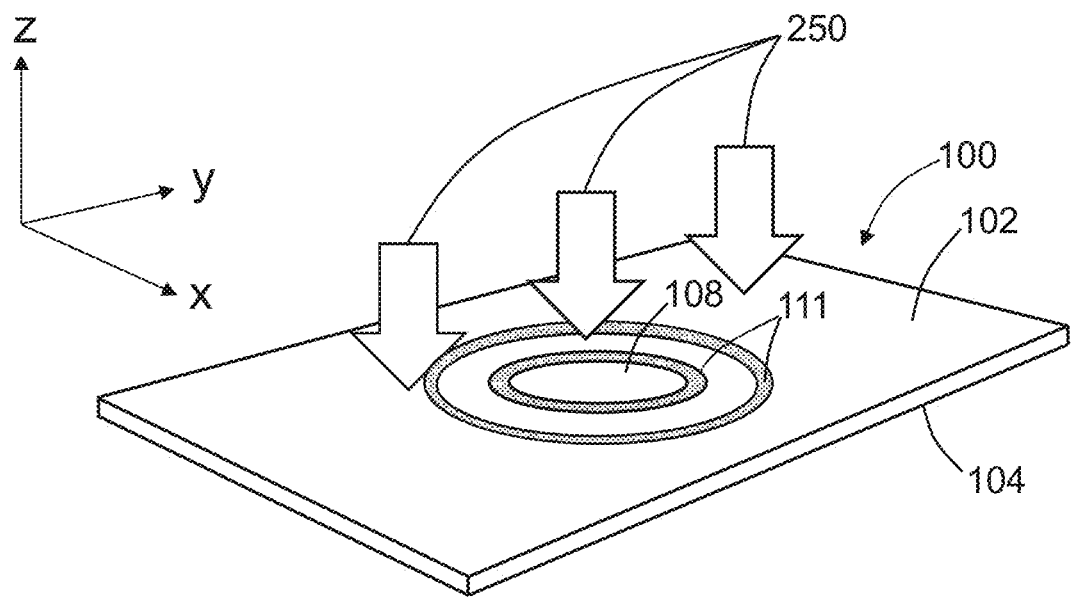

FIGS. 12G and 12H are similar to FIGS. 12C and 12D and illustrate an example where the main and secondary focus rings FR and FR' form concentric annular modified regions, wherein the outer annular modified region 111 is formed by the secondary focus ring and does not reach to the back surface 104 of the object 100. The etching process 250 acts on the outer annular modified region to form the aforementioned annular recess 221 so that the resulting object 100 is the substantially the same as that shown in FIG. 10F.

Micro-Hole Array

FIG. 13 is an elevated view that illustrates an example of an object 100 in which an array 222 of micro-holes 220 is formed. The micro-holes 220 can be annular micro-holes 220A or through micro-holes 220T. Example micro-holes 220 can have a diameter DM in the range from 10 μm to 500 μm. The spacing between adjacent micro-holes 220 can be as small as a fraction of the micro-hole diameter DM. In an example, for micro-holes 220 having a diameter of 10 μm and a center-to-center spacing of 20 μm allows for a hole density of about 2500 micro-holes per square millimeter.

Examples of Micro-Hole Formation

Experiments for micro-hole formation were carried out on select types of glass objects 100 using the beam-forming system 10B of FIG. 2A as disclosed herein and discussed in detail above. The laser source 110 was an ultrafast pulsed laser with a power adjustable between 0.5 Watt (W) and 6 W, a pulse frequency (i.e., frequency of light pulses LP adjustable between 3 kHz and 200 kHz, a pulse width adjustable between 0.256 picoseconds (ps) and 10 ps, and an operating wavelength of 1030 nm. The phase device 60 was defined by an SLM that incorporated (encoded) the axicon angle γ and the topological charge m. Since the axicon lens 30 was not used to form the phase device 60, a beam blocker BB was placed immediately downstream of the SLM to block zero-order diffraction and stray light in the center portion of the phase-encoded hollow beam 22H', as shown as an option in the example embodiment of the beam-forming system 10B of FIG. 2A.

The benefit of using an active phase element such as an SLM to form the phase device 60 is the ability to perform different experiments by testing several combinations of axicon angle γ and topological charge without the need to swap out the other optics components within the beam-forming system.

In one experiment, the object 100 was an alkaline earth boro-aluminosilicate fusion-drawn glass sheet of the type used for active-matrix flat panel displays. The glass sheet has a thickness TH of 0.7 mm. The glass sheet was irradiated with annular vortex beams 22A having different amounts of power. The irradiated glass sheet was analyzed and it was found that laser powers in the range from 1500 milliwatts to 6000 milliwatts and the SLM-based phase device 60 programmed with an axicon angle γ of 0.01° and a topological charge of m=5 formed annular modified regions 111 suitable for etching to form micro-holes 220 in accordance with the two-step process described above.

Once the basic laser and phase device parameters for achieving material modification of the glass sheet were determined, an example beam-forming system 10B of FIG. 1A was assembled. The phase device 60 of the beam-forming system 10B was formed using a precision axicon lens 30 with an axicon angle γ of 9.5° and a phase plate as the phase element 50, with the phase plate having an axicon angle γ of 0° (due to the use of the upstream axicon lens) and a topological charge of m=3. The first and second lenses L1 and L2 each had a focal length of f=52 mm. The laser source 110 was set per above to provide sufficient power for forming annular modified regions 111 so that the micro-holes 220 could be formed using the above-described two-step process. The focus ring FR had a diameter D2 of about 25 μm at a focal distance df of 70 mm. The depth of focus DOF was estimated to be about 40 mm. The peak intensity of the focus ring FR was at df=70 mm, but a similar diameter and intensity profile was found at ±20 mm from this location. Within this distance, the diameter D2 of the focus ring FR only changed 1.4 μm and while the intensity changed by 33%. Note that the depth of focus DOF can be said to be smaller or greater than 40 mm, depending on how much the diameter D2 of the focus ring and the intensity of the focus ring can vary for the given micro-hole-forming application.

In an example, the depth of focus DOF can be determined by collecting a series of images of the actual annular vortex beam 22A at incremental steps in the direction of the propagation of the annular vortex beam to obtain beam intensity profiles at different axial positions and then stitching the images together to obtain a beam intensity profile in the propagation direction. The portion of the beam intensity profile with the highest intensity (e.g., above a select intensity threshold) defines the depth of focus DOF.

The depth of focus DOF can also be assessed by irradiating an object 100 with the annular vortex beam 22A and axially moving the object (or the beam-forming system 10B) to change the position of the object relative to the focal plane FP of the beam-forming system while monitoring the formation of a plasma on the object. The formation of a plasma is an indicator of micro-hole formation, so that the depth of focus DOF can be defined as the distance over which micro-hole formation occurs or equivalently the distance over which plasma formation occurs. As noted above, the depth of focus DOF can be adjusted by changing at least one of the input beam diameter, the axicon angle γ and the focal lengths of the lenses L1 and/or L2.

Additional simulations were performed for the example beam-forming system 10B where the topological charge was increased from m=3 to m=6, while the lenses L1 and L2 of the optical system 80 had respective focal lengths of f1=52 mm and f2=26 mm to provide a 50% demagnification to maintain the diameter D2 of the focus ring FR at 25 µm. The result was that the depth of focus DOF was 10 mm (a 4× reduction from the m=3 case), while the intensity of the focus ring FR increased by 4×.

To determine how much laser exposure is required to form micro-holes, an experiment was performed in which a sample of Gorilla® Glass (available from Corning, Inc., Corning, New York) having a thickness TH of 0.7 mm thick was tested using a 6000 mW, 1 ps, 3 kHz Gaussian laser beam. Laser damage was shown to occur when exposed to a range of 1000 shots (333 ms) to 50,000 shots (16.67 s).

In another experiment, a 25 mm long by 25 mm wide sample of an alkaline earth boro-aluminosilicate fusion-drawn glass sheet of thickness TH=0.7 mm was exposed to laser beams having various laser parameters, such as frequencies of 3 kHz and 200 kHz, laser power in the range from 1500 mW to 5500 mW, exposure times of 30 s to 120 s, and pulse widths of 256 fs to 10 ps. The irradiated glass sheet was then etched with an acid solution of 10% HF, 15% Nitric Acid, 75% water (by volume). After 90 minutes of static etching, through micro-holes were formed. After another 30 minutes of etching with ultrasonic assist, through micro-holes 50 µm in diameter were formed using 60 s and 120 s laser exposure times.

The nominal etch rate for the above-described etchant solution was measured at 1.6 µm/min, resulting in an expected etch of 192 µm in 120 minutes. This etch rate was observed in the thickness direction with a final thickness of about 0.5 mm. The surface hole diameter was approximately 170 µm, with the through hole diameter approximately 75 µm, which are lower than the nominal etch rate due to the impedance of waste material in the hole region during etching.

Figure 14:
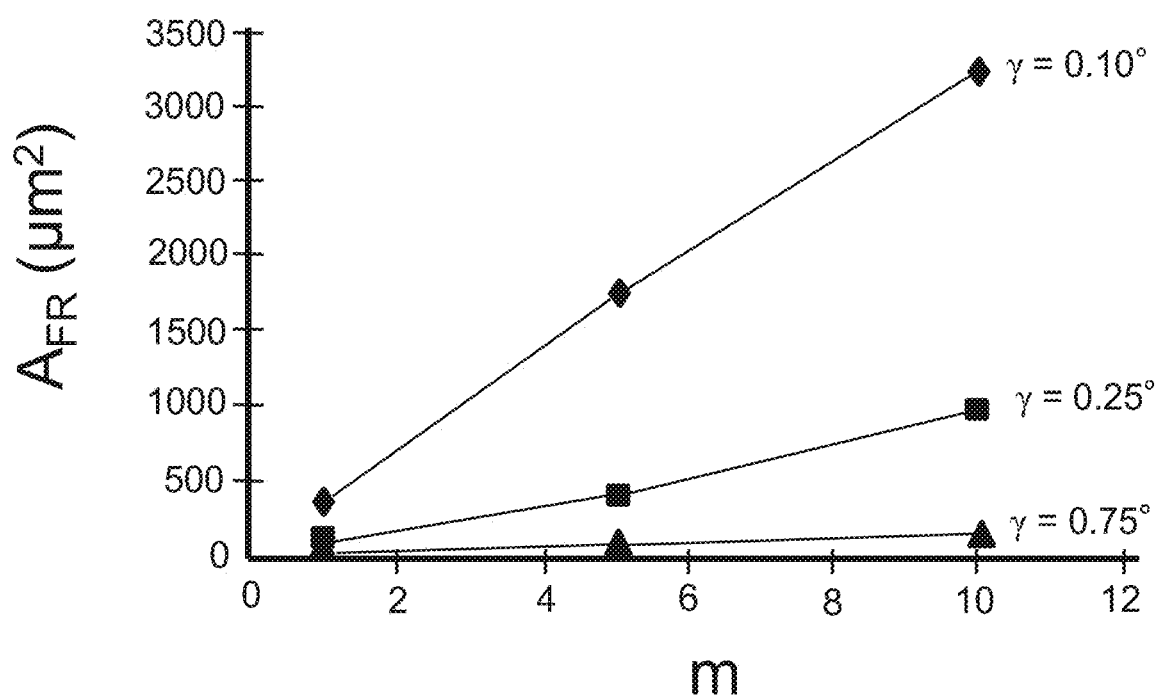
FIG. 14 is a plot of the area of the focus ring $A_{FR}$ (μm) versus the topological charge m for different values of the axicon angle γ, illustrating how varying the axicon angle γ and the topological charge m can be used to vary the size of the focus ring and thus the size of the micro-holes formed by the annular vortex beam.

FIG. 14 is a plot of the measured area $A_{FS}$ (µm$^2$) of the focus ring FR versus the topological charge m for different values of the axicon angle γ, namely γ=0.10°, 0.25° and 0.75°. The relatively small range on the axicon angle γ was due to limitations in the optical components used in constructing the example beam-forming system 10B. Despite the small values of the axicon angle γ, the plot of FIG. 14 shows the relationships between the size of the focus ring FR and the annular vortex beam parameters γ and m, with a higher topological charge m, and lower axicon angle γ producing the largest focus ring area. These relationships can be used to define a desired size of the focus ring FR and thus a desired size for the micro-holes 220 formed using the annular vortex beam 22A.

Advantages

The systems and methods disclosed herein have a number of advantages. These include a relatively large depth of focus DOF, e.g., from 2 mm to 40 mm, so that there is no need for beam refocusing for forming micro-holes with depths of up to about 2 mm in glass-based objects. In addition, relatively thick objects can be processed, and in some examples, the multiple of objects can be stacked and then processed in the stacked configuration.

Another advantage is the ability to use either a one-step process or a two-step process, depending on the amount of laser power available and the power density of the focus ring. Forming a modified region in the body of the object and then etching the object to form the micro-hole(s) allows for only having to remove an annular-shaped section of the object body that has been irradiated. The preferential etching properties of the modified region makes the etching step relatively fast (e.g., 10×-1000× faster) as compared to conventional methods of forming micro-holes using an etch process.

Another advantage is that changing the size of the focus ring can be accomplished by replacing the phase element, which in one example can involve swapping one phase plate for another and in another example can involve reprogramming an active phase element. This flexibility is particularly advantageous in manufacturing since changes to the beam-forming system can be made quickly.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of forming a micro-hole in a glass-based object having a body that defines opposite first and second surfaces, comprising:
   a) forming a phase device with a phase distribution defined by:

$$\varphi_{PD}(r,\theta) = \varphi_1(r,\theta) + \varphi_2(r,\theta),$$

wherein $\varphi_1(r,\theta)$ is a first phase term equal to $-k \cdot r \cdot \sin(\gamma)$ and $\varphi_2(r,\theta)$ is a second phase term equal to $m \cdot \theta$, where $(r, \theta)$ are polar radial and angular coordinates, γ is an axicon angle in the range $0.10° \leq \gamma \leq 20°$, and m is a topological charge in the range $3 \leq m \leq 20$, where m is an integer;
   b) directing a Gaussian laser beam to the phase device to convert the Gaussian beam to an annular vortex beam having the phase distribution $\varphi_{PD}(r,\theta)$, a depth of focus DOF, a wavelength λ, a first focus ring within the depth of focus DOF and having an inner diameter D1, an outer diameter D2, and a width WA=(D2−D1)/2, and a second focus ring within the depth of focus DOF and having inner and outer diameters that are larger than the inner diameter D1 and the outer diameter D2;
   c) directing the annular vortex beam to the first surface and through the body of the glass-based object, thereby irradiating annular regions of the body within the depth of focus to form irradiated annular regions, wherein said irradiating either:
   i) transforms the irradiated annular regions to concentric modified annular regions that etch preferentially as compared to a portion of the body that has not been irradiated by the annular vortex beam;
   ii) transforms a portion of the irradiated annular regions into a closed-end annular micro-hole and an annular recess that surrounds the closed-end annular micro-hole by ablating the portion of the irradiated annular regions; or
   iii) transforms an inner one of the irradiated annular regions into a through micro-hole by ablating the inner one of the irradiated annular regions and transforms an outer one of the irradiated annular regions into an annular recess by ablating the outer one of the irradiated annular regions.

2. The method according to claim 1, wherein the phase device comprises either:
   an axicon lens configured to define the first phase term $\phi_1(r,\theta)$ and a phase element configured to define the second phase term $\phi_2(r,\theta)$; or a single phase element configured to define the first phase term $\phi_1(r,\theta)$ and the second phase term $\phi_2(r,\theta)$.

3. The method according to claim 2, wherein the phase element comprises either a phase plate or an active phase element.

4. The method according to claim 3, wherein the active phase element comprises a spatial light modulator.

5. The method according to claim 1, wherein the irradiating forms the modified annular regions, and further comprising:
performing an etching process to remove an inner one of the modified annular regions to form a substantially cylindrical through micro-hole, wherein the etching process comprises at least one of:
i) an application of heat;
ii) an application of ultrasound; or
ii) an application of an acid etchant.

6. The method according to claim 1, wherein:
the irradiating transforms the portion of the irradiated annular regions into the closed-end annular micro-hole and the annular recess that surrounds the closed-end annular micro-hole by ablating the portion of the irradiated annular regions, and
the annular micro-hole and the annular recess have different relative depths.

7. The method according to claim 1, wherein:
the irradiating transforms the portion of the irradiated annular regions into the closed-end annular micro-hole and the annular recess that surrounds the closed-end annular micro-hole by ablating the portion of the irradiated annular regions, and
the annular micro-hole and the annular recess have substantially identical depths.

8. The method according to claim 1, wherein:
the irradiating transforms the inner one of the irradiated annular regions into the through micro-hole by ablating the inner one of the irradiated annular regions and transforms the outer one of the irradiated annular regions into the annular recess by ablating the outer one of the irradiated annular regions, and
the annular recess serves as a location for debris collection and creates surface texture on the glass-based object.

9. The method according to claim 1, wherein:
the irradiating transforms the inner one of the irradiated annular regions into the through micro-hole by ablating the inner one of the irradiated annular regions and transforms the outer one of the irradiated annular regions into the annular recess by ablating the outer one of the irradiated annular regions, and
the annular recess serves as a location for debris collection and creates surface texture on the glass-based object.

10. The method according to claim 1, wherein:
the glass-based object comprises a plurality of glass layers stacked together, and
an index-matching fluid is disposed between confronting surfaces of each of the glass layers during the irradiating.

11. A method of forming a micro-hole in a glass-based object having a body that defines opposite first and second surfaces, comprising:
a) forming an annular vortex beam having a depth of focus DOF, a wavelength $\lambda$, a first focus ring within the depth of focus DOF, wherein the first focus ring has an inner diameter D1, an outer diameter D2, and a width WA=(D2−D1)/2, and a second focus ring within the depth of focus DOF and having inner and outer diameters that are larger than the inner diameter D1 and the outer diameter D2;
b) directing the annular vortex beam to the first surface and through the body of the glass-based object, thereby irradiating annular regions of the body to transform the annular regions to an inner modified annular region and an outer modified annular region that etch preferentially as compared to a portion of the body that has not been irradiated by the annular vortex beam; and
c) etching the glass-based object to remove the inner modified annular region to form the micro-hole, and remove a portion of the outer modified annular region to form an annular recess surrounding the micro-hole.

12. The method according to claim 11, wherein forming the annular vortex beam comprises:
forming a Gaussian beam from a laser source;
directing the Gaussian beam through an axicon lens having an axicon angle $\gamma$ to form a hollow beam;
directing the hollow beam to a phase element configured with phase regions defined by a topological charge m, wherein m is an integer in the range 1≤m≤20, and wherein the hollow beam is either transmitted through or reflected from the phase element to define a phase-modulated hollow beam; and
focusing the phase-modulated hollow beam to a focus plane that defines a center of the depth of focus DOF, and wherein the glass-based object resides within the depth of focus DOF.

13. A method of forming a micro-hole in a glass-based object having a body that defines opposite first and second surfaces, comprising:
a) forming an annular vortex beam having a depth of focus DOF, a wavelength $\lambda$, a first focus ring within the depth of focus DOF, wherein the first focus ring has an inner diameter D1, an outer diameter D2, and a width WA=(D2−D1)/2, and a second focus ring within the depth of focus DOF and having inner and outer diameters that are larger than the inner diameter D1 and the outer diameter D2; and
b) directing the annular vortex beam to the first surface and into the body of the glass-based object and either:
i) ablating annular portions of the body from the first surface but not reaching the second surface to form the micro-hole in the form of a closed annular micro-hole having a central portion and an annular recess surrounding the micro-hole; or
ii) ablating an annular portion of the body from the first surface to the second surface to form the micro-hole as a substantially cylindrical through micro-hole and the annular recess surrounding the micro-hole.

14. The method according to claim 13, wherein the annular vortex beam has a peak intensity in the range from 110 TW/cm$^2$ to 4800 TW/cm$^2$.

15. The method according to claim 13, wherein the outer diameter D2 is in the range from 5 microns to 60 microns and wherein the width WA is in the range from 5 microns to 9 microns.

16. The method according to claim 13, wherein the depth of focus is in the range from 2 mm to 40 mm as measured by the outer diameter D2 of the focus ring varying in size by no more than 10% from a minimum outer diameter D2 $_{MIN}$ of the focus ring.

17. A system for forming a micro-hole in a glass-based object having a body that defines opposite first and second surfaces, comprising:

a) a laser source configured to generate a Gaussian laser beam;
b) an optical system operably disposed to receive and process the Gaussian laser beam, the optical system including a phase device configured with a phase distribution $\varphi_{PD}(r, \theta) = \varphi_1(r, \theta) + \varphi_2(r,\theta)$, wherein $\varphi_1(r,\theta)$ is a first phase term equal to $-k \cdot r \cdot \sin(\gamma)$ and $\varphi_2(r,\theta)$ is a second phase term equal to $m \cdot \theta$, where $(r, \theta)$ are polar radial and angular coordinates, $\gamma$ is an axicon angle in the range $0.10° \leq \gamma \leq 20°$, and m is a topological charge in the range $3 \leq m \leq 20$, where m is an integer;
c) wherein the Gaussian laser beam is processed by the optical system and the phase device therein to convert the Gaussian laser beam to an annular vortex beam that exits the optical system along a system axis, the annular vortex beam having the phase distribution $\varphi_{PD}(r,\theta)$, a depth of focus DOF, a wavelength 2, a first focus ring within the depth of focus DOF and having an inner diameter D1, an outer diameter D2, and a width WA= (D2−D1)/2, and a second focus ring within the depth of focus DOF and having inner and outer diameters that are larger than the inner diameter D1 and the outer diameter D2; and
d) a support stage configured to operably support the glass-based object relative to the annular vortex beam so that the annular vortex beam travels through the first surface and through the body of the glass-based object, thereby irradiating an annular region of the body within the depth of focus to form an irradiated annular region, wherein said irradiating either:
  i) transforms the irradiated annular regions to concentric modified annular regions that etch preferentially as compared to a portion of the body that has not been irradiated by the annular vortex beam;
  ii) transforms a portion of the irradiated annular regions into a closed-end annular micro-hole and an annular recess that surrounds the closed-end annular micro-hole by ablating the portion of the irradiated annular regions; or
  iii) transforms an inner one of the irradiated annular regions into a through micro-hole by ablating the inner one of the irradiated annular regions and transforms an outer one of the irradiated annular regions into an annular recess by ablating the outer one of the irradiated annular regions.

18. The system according to claim 17, wherein the phase device comprises either:
an axicon lens configured to define the first phase term $\phi_1(r,\theta)$ and a phase element configured to define the second phase term $\phi_2(r,\theta)$; or
a single phase element configured to define the first phase term $\phi_1(r,\theta)$ and the second phase term $\phi_2(r,\theta)$.

19. The system according to claim 18, wherein the phase element comprises either a phase plate or an active phase element.

20. The system according to claim 17, wherein the laser source comprises a diode-pumped pulse laser that emits optical pulses having a wavelength $\lambda$ transparent to material being processed and a temporal pulse width from 200 femtoseconds to 20 picoseconds.

21. The system according to claim 17, wherein the glass-based object consists of a planar glass sheet having a thickness TH in the range 0.5 mm TH 2 mm.

22. The system according to claim 17, wherein the micro-hole has a diameter from 10 microns to 500 microns.

23. The system according to claim 17, wherein the depth of focus is in the range from 2 mm to 40 mm as measured by the outer diameter D2 of the focus ring varying in size by no more than 10% from a minimum outer diameter $D2_{MIN}$ of the focus ring, and wherein the width WA of the focus ring is in the range from 5 microns to 9 microns.

* * * * *